United States Patent
Dorner et al.

(10) Patent No.: US 7,321,887 B2
(45) Date of Patent: Jan. 22, 2008

(54) ENRICHING INFORMATION STREAMS WITH CONTEXTUAL CONTENT

(75) Inventors: Elmar Dorner, Karlsruhe (DE); Rainer Ruggaber, Paddington (AU)

(73) Assignee: SAP Aktiengesellschaft, Walldorf (DE)

( * ) Notice: Subject to any disclaimer, the term of this patent is extended or adjusted under 35 U.S.C. 154(b) by 270 days.

(21) Appl. No.: 10/259,787

(22) Filed: Sep. 30, 2002

(65) Prior Publication Data
US 2004/0064431 A1    Apr. 1, 2004

(51) Int. Cl.
*G06F 17/30* (2006.01)
(52) U.S. Cl. .............................. 707/1; 707/3; 707/101; 707/203
(58) Field of Classification Search ................ 707/1–4, 707/10, 100, 102, 101, 200, 203; 370/355, 370/399; 713/181; 715/736; 709/201, 203, 709/238, 242
See application file for complete search history.

(56) References Cited

U.S. PATENT DOCUMENTS

| | | |
|---|---|---|
| 5,442,740 A | 8/1995 | Parikh |
| 5,848,424 A | 12/1998 | Scheinkman et al. |
| 5,995,943 A | 11/1999 | Bull et al. |
| 6,041,331 A | 3/2000 | Weiner et al. |
| 6,049,821 A | 4/2000 | Theriault et al. |
| 6,058,277 A | 5/2000 | Streefkerk et al. |
| 6,064,980 A | 5/2000 | Jacobi et al. |
| 6,076,166 A | 6/2000 | Moshfeghi et al. |
| 6,085,229 A | 7/2000 | Newman et al. |
| 6,094,648 A | 7/2000 | Aalbersberg |
| 6,154,764 A | 11/2000 | Nitta et al. |
| 6,181,342 B1 | 1/2001 | Niblack |
| 6,209,100 B1 | 3/2001 | Robertson et al. |
| 6,236,395 B1 | 5/2001 | Sezan et al. |
| 6,266,649 B1 | 7/2001 | Linden et al. |
| 6,271,840 B1 | 8/2001 | Finseth et al. |
| 6,300,947 B1 | 10/2001 | Kanevsky |

(Continued)

FOREIGN PATENT DOCUMENTS

EP    1 143 679 A2    10/2001

(Continued)

OTHER PUBLICATIONS

Amazon.com, "Recommendations," http://www.amazon.com/exec/obidos/tg/browse/-/508506/ref=br_bx_c_2_1/002-7851280-4410446, (undated and Applicants believe it was publicly available prior to Sep. 30, 2002), printed from the Internet Feb. 27, 2004, 2 pgs.

(Continued)

*Primary Examiner*—Don Wong
*Assistant Examiner*—Marcin Filipczyk
(74) *Attorney, Agent, or Firm*—Fish & Richardson P.C.

(57) ABSTRACT

Methods and systems for enriching information streams with supplemental content are disclosed. A contextual publisher may eavesdrop on an information distribution service, such as a news wire, and detect the presence of particular messages having subject matter in which the contextual publisher has expertise. The contextual publisher may thus generate content that is supplemental to the messages, and forward this supplemental content to the original recipients of the messages. In this way, users may receive timely information about topics in which they have a current interest.

21 Claims, 14 Drawing Sheets

U.S. PATENT DOCUMENTS

| | | | |
|---|---|---|---|
| 6,317,722 B1 | 11/2001 | Jacobi et al. | |
| 6,317,751 B1* | 11/2001 | Yeger et al. | 707/104.1 |
| 6,327,628 B1 | 12/2001 | Anuff et al. | |
| 6,338,059 B1 | 1/2002 | Fields et al. | |
| 6,338,096 B1 | 1/2002 | Ukelson | |
| 6,356,908 B1 | 3/2002 | Brown et al. | |
| 6,356,922 B1 | 3/2002 | Schilit et al. | |
| 6,421,706 B1 | 7/2002 | McNeill et al. | |
| 6,438,580 B1 | 8/2002 | Mears et al. | |
| 6,438,632 B1 | 8/2002 | Kikugawa | |
| 6,457,026 B1 | 9/2002 | Graham et al. | |
| 6,460,036 B1 | 10/2002 | Herz | |
| 6,470,338 B1 | 10/2002 | Rizzo et al. | |
| 6,549,935 B1 | 4/2003 | Lapstun et al. | |
| 6,553,412 B1 | 4/2003 | Kloba et al. | |
| 6,594,682 B2 | 7/2003 | Peterson et al. | |
| 6,646,549 B2 | 11/2003 | Dawson | |
| 6,697,824 B1 | 2/2004 | Bowman-Amuah | |
| 6,714,979 B1* | 3/2004 | Brandt et al. | 709/225 |
| 6,725,227 B1 | 4/2004 | Li | |
| 6,741,853 B1 | 5/2004 | Jiang et al. | |
| 6,741,980 B1 | 5/2004 | Langseth et al. | |
| 6,904,463 B1 | 6/2005 | Fadel | |
| 6,918,090 B2 | 7/2005 | Hesmer et al. | |
| 6,947,959 B1 | 9/2005 | Gill | |
| 6,959,319 B1 | 10/2005 | Huang et al. | |
| 6,973,665 B2 | 12/2005 | Dudkiewicz et al. | |
| 6,978,316 B2 | 12/2005 | Ghaffar et al. | |
| 6,990,633 B1 | 1/2006 | Miyasaka et al. | |
| 6,993,529 B1 | 1/2006 | Basko et al. | |
| 7,017,183 B1 | 3/2006 | Frey et al. | |
| 7,072,983 B1 | 7/2006 | Kanai et al. | |
| 2001/0017707 A1 | 8/2001 | Lee | |
| 2002/0018078 A1 | 2/2002 | Khan et al. | |
| 2002/0049833 A1 | 4/2002 | Kikinis | |
| 2002/0053078 A1 | 5/2002 | Holtz et al. | |
| 2002/0059584 A1 | 5/2002 | Ferman et al. | |
| 2002/0112240 A1 | 8/2002 | Bacso et al. | |
| 2002/0122063 A1 | 9/2002 | Weinberg et al. | |
| 2002/0138844 A1 | 9/2002 | Otenasek et al. | |
| 2002/0143659 A1* | 10/2002 | Keezer et al. | 705/27 |
| 2002/0174230 A1 | 11/2002 | Gudorf et al. | |
| 2002/0178007 A1 | 11/2002 | Slotznick et al. | |
| 2002/0198859 A1 | 12/2002 | Singer et al. | |
| 2002/0198973 A1 | 12/2002 | Besaw | |
| 2003/0018815 A1 | 1/2003 | Spicer et al. | |
| 2003/0028896 A1 | 2/2003 | Swart et al. | |
| 2003/0033161 A1* | 2/2003 | Walker et al. | 705/1 |
| 2003/0093790 A1* | 5/2003 | Logan et al. | 725/38 |
| 2003/0101412 A1 | 5/2003 | Eid | |
| 2003/0126136 A1 | 7/2003 | Omoigui | |
| 2003/0217061 A1 | 11/2003 | Agassi et al. | |
| 2003/0229900 A1 | 12/2003 | Reisman | |
| 2004/0059705 A1 | 3/2004 | Wittke et al. | |
| 2004/0088355 A1 | 5/2004 | Hagan et al. | |
| 2004/0205473 A1 | 10/2004 | Fisher et al. | |
| 2004/0220926 A1 | 11/2004 | Lamkin et al. | |
| 2004/0230572 A1 | 11/2004 | Omoigui | |
| 2005/0193335 A1* | 9/2005 | Dorai et al. | 715/530 |
| 2005/0204276 A1 | 9/2005 | Hosea et al. | |

FOREIGN PATENT DOCUMENTS

| | | |
|---|---|---|
| EP | 1 176 520 A2 | 1/2002 |
| EP | 1 367 513 A2 | 12/2003 |
| GB | 2 367 158 | 3/2002 |
| WO | WO 99/62011 | 12/1999 |
| WO | WO 00/65773 | 11/2000 |
| WO | WO 00/77689 | 12/2000 |
| WO | WO 01/06398 | 1/2001 |
| WO | WO 01/09737 A1 | 2/2001 |
| WO | WO 01/13287 A | 2/2001 |
| WO | WO 01/18688 A2 | 3/2001 |
| WO | WO 01/77903 A1 | 10/2001 |
| WO | WO 01/81829 A1 | 11/2001 |

OTHER PUBLICATIONS

Amazon.com, "Why Was I Recommended This?" http://www.amazon.com/exec/obidos/tg/browse/-/764534/ref%3Dbr%5Fbx%5Fc%5F2%5F2/002-/002-7851280-4410446, (undated and Applicants believe it was publicly available prior to Sep. 30, 2002), printed from the Internet Feb. 27, 2004, 2 pgs.

Amazon.com, "Your Favorites," http://www.amazon.com/exec/obidos/tg/browse/-/560726/ref=br_bx_c_2_0/002-7851280-4410446, (undated and Applicants believe it was publicly available prior to Sep. 30, 2002), printed from the Internet Feb. 27, 2004, 2 pgs.

Google News (BETA), "Top Stories," http://news.google.com, (undated and Applicants believe it was publicly available prior to Sep. 30, 2002), printed from the Internet Oct. 1, 2002, 5 pgs.

Google News (BETA), "A Novel Approach to News," http://news.google.com/help/about_news_search.html, (undated and Applicants believe it was publicly available prior to Sep. 30, 2002), printed from the Internet Oct. 1, 2002, 3 pgs.

Netflix, "About Netflix," http://www.netflix.com/PressRoom?id=1005, (undated and Applicants beleive it was publicly available prior to Sep. 30, 2002), printed from the Internet Jan. 5, 2004, 1 pg.

Netflix, "Fact Sheet," http://www.netflix.com/PressRoom?id=5206, (undated and Applicants believe it was publicly available prior to Sep. 30, 2002), printed from the Internet Jan. 5, 2004, 3 pgs.

SAP Aktiengesellschaft, "mySAP Technology: Portal Infrastructure: People-Centric Collaboration," undated materials, copyright 2001, 28 pgs.

"What is My Yahoo!?," http://wizards.yahoo.com/members/tools/publishing/wizards/server/bottom-right/1, (undated and Applicants believe it was publicly available prior to Sep. 30, 2002), printed from the Internet Feb. 27, 2004, 7 pgs.

Bhatia, S. K., "Selection of Search Terms Based on User Profile," Proceedings of the 1992 ACM/SIGAPP Symposium on Applied Computing: Technological Challenges of the 1990's, Kansas City, MO, 1992, pp. 224-233.

Kamba, T. et al., "The Krakatoa Chronicle—An Interactive, Personalized, Newspaper on the Web," Proceedings of the International Conference on World Wide Web, Dec. 11, 1995, pp. 1-12.

Salembier, P. et al., "Description Schemes for Video Programs, Users and Devices," Signal Processing: Image Communication, Sep. 2000, vol. 16, pp. 211-234.

Seo, Y. W. et al., "Learning User's Preferences by Analyzing Web-Browsing Behaviors," Proceedings of the Fourth International Conference on Autonomous Agents, Barcelona, Spain, Jun. 3-7, 2000, pp. 381-387.

Sugiura, A. et al., "Internet Scrapbook: Automating Web Browsing Tasks by Demonstration," UIST '98, ACM Symposium on User Interface Software and Technology, San Francisco, CA, Nov. 1-4, 1998, pp. 9-18.

Boguraev, Branimir et al., "Dynamic Presentation of Document Content for Rapid On-Line Skimming" AAAI Symposium on Intelligent Text Summarization, Mar. 23, 1998, 10 pages.

Graham, Jamey, "The Reader's Helper: A Personalized Document Reading Environment," CHI '99 Conference Proceedings Human Factors in Computing Systems, Pittsburgh, PA, May 15, 1999, 9 pages.

IBM, "IBM Websphere Portal Server Product Architecture V2.1," Nov. 19, 2001, pp. 1-31, XP002268018.

Li, Chung-Sheng, et al., "Multimedia Content Description in the Infopyramid," Acoustics, Speech and Signal Processing, Proceedings of the 1998 IEEE International Conference, May 12, 1998, pp. 3789-3792, XP010279595.

\* cited by examiner

Four of our top customers in the East ⎯330
Region have pending complaints

Wacky Foods, with an annual sales volume of $10M have 8 ⎯340
pending complaints; My Muffin Ltd with $4M of annual sales
have 1; Breads R Us with $1M of annual sales have 3; and ⎯345
Have Your Cake Inc with $850K of annual sales have 2. The
complaints KPI is at 88.7M.

Top Customers of Eastern Region - Pending Complaints

| Customer | Sales Vol | Complaints |
|---|---|---|
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

Today's marketing strategy meeting postponed ⎯360

George Simmons rescheduled the meeting to Wed, 4/23 at
9:15 in the Paris room. Your calendar has been updated.

Other News ⎯365
6 documents are awaiting your approval
Phil Collins to perform in Shark Tank
1 important email Competition News
Burger Queen names James
Joaquin as CIO
Chico Catering and Krafti
Cheese announce strategic
partnership Market Report
Dow     10,543.17  -54.12
Nasdaq   1719.67   +8.01
S&P      1201.31   -4.23

WAKY    44.31   -1.21
MMUF    18.11   +0.05
BRUS    22.90   +0.87
HYOC    87.60   -12.32

Profile
George Simmons

Executive VP
(408) 555-1130
Bldg D, E.02
george@sap.com
Age:43
San Mateo, CA

FIG. 4

```
<Article>
<Time>2002-04-24 15:02</Time>    /—1405         /—1400
    <Importance>Normal</Importance>
    <Author>agent@food4all.com</Author>
    <Content Type=" text/narrative ">
    <Headline>                        —1410         /—1415
        Four of our top customers in the Eastern Region have pending complaints.
    </Headline>
    <Details>                                      /—1420
        Wacky Foods, with an annual sales volume of $10M have 8 pending complaints;
        My Muffin Ltd with $4M of annual sales have 1; Breads R Us with $1M of
        annual sales have 3; and Have Your Cake, Inc with $850K of annual sales
        have 2. The complaints KPI is at 88.7M
    </Details>
    </Content>
    <Content Type=" text/html    " >/—1425
    <Headline>
        Pending Support Complaints for Top Customers in Eastern Region /—1430
    </Headline>
    <Html>                                                             /—1435
```

| Top Customers of Eastern Region - Pending Support Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

```
    </Html>
    </Content>
    <Content Type=" image/gif  ">
    <Headline>                       —1440
        Pending Support Complaints for Top Customers in Eastern Region
    </Headline>                                                        —1445
    <Image>                                                            /—1450
```

```
    </Image>
    </Content>
    <Content Type=" music/midi  ">/—1455
    <Midi>
```

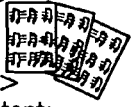

/—1460

```
    </Midi>
    </Content>
</Article>
```

FIG. 14

ENRICHING INFORMATION STREAMS WITH CONTEXTUAL CONTENT

TECHNICAL FIELD

Certain disclosed implementations relate generally to the provision of information, and, more particularly, to providing content that supplements previously-provided information.

BACKGROUND

Technologies exist which allow users to designate categories of information in which desired content may be presented. For example, web sites may allow users to select categories from a variety of different sources and content providers. Such sites are generally known as "portals," and provide a central gateway through which users can be presented with options and links to various information sources. In this way, users can check, for example, their stocks, mail, local weather, sports scores, and movie listings.

In another example, portals are capable of providing categorized content in disparate pieces (sometimes referred to as "iViews"), where each iView and its associated content can be aggregated into a single delivery package (for example, a web page). Users may select a category of content to be included within each iView, and may generally choose which iView(s) to see and exercise some control over how it is positioned inside the aggregated result. Once personalized, however, the result is static. That is, the set of iViews shown is constant, as well as the order in which iViews within the set are shown. The content of each iView is likely to change over time (for example, actual news headlines), but its overall subject is usually static (for example, company news).

Other techniques exist that attempt to provide users with content that will be of particular interest to each user. For example, web sites may track items such as books and Digital Video Disks ("DVDs") based on attributes of such items, such as title, author, performer, and genre. By tracking previously-purchased books and DVDs, registered users may be presented with a web page offering items with similar attributes.

SUMMARY

Various implementations extend a portal system to provide the capability of displaying supplemental contextual information based on content that is already shown. One implementation looks for metadata that each iView contains (for example, an article about Intel will contain metadata indicating that it is about a "Company" called "Intel") and, based on this metadata, includes supplemental iViews that are related to this metadata (for example a stock ticker iView that will show the current stock price of Intel).

Other implementations may be used in connection with a non-portal system, such as a system in which a pool of articles is accumulated before a user signs on to the system. In these systems, the articles in the pool may be ranked and/or filtered according to criteria such as user preferences, and supplemental content can be generated before or after the ranking/filtering process.

Other implementations may be used in connection with a news information service, in which a publisher of supplemental contextual information eavesdrops on the news information service for messages concerning topics about which the publisher has, or can obtain, supplemental content. Recipients of the original message(s) can thus receive the supplemental content, as well.

Thus, various implementations provide a means to dynamically supplement displayed information based on the content of the information, and to thereby enhance the user experience by displaying such supplemental contextual content.

In one general aspect, content may be supplemented by inputting a primary media asset, where the primary media asset may include primary content and primary content metadata characterizing individual elements of the primary content. Supplemental content logic may be accessed, where the supplemental content logic may include rules for the selection of supplemental content based on the primary content metadata. A supplemental media asset may be output, based on the supplemental content logic.

In inputting a primary media asset, a topic for supplemental content may be selected, and the information distribution service may be monitored for a media asset concerning the topic to be utilized as the primary media asset. In monitoring the information distribution service, a channel of a channel-based subscription service may be subscribed to, wherein the channel corresponds to the topic. Additionally or alternatively, in monitoring the information distribution service, a content-based messaging system may be subscribed to, and the media asset may be analyzed for selectively inputting as the primary media asset, based on the primary content metadata.

In inputting a primary media asset, an information distribution service may be monitored, where the information distribution service may be operable to route the primary media asset from a sender to a recipient based on routing information associated with the primary media asset.

In outputting a supplemental media asset the supplemental media asset may be sent to the recipient, based on the routing information. The supplemental media asset may be sent via the information distribution service.

The routing information may be an email address or channel-subscription information.

The recipient may be a client application operable to convert the message into a user-accessible format.

In monitoring an information distribution service, a media asset may be cached prior to a time that the recipient requests the primary media asset, and the media asset may be utilized as the primary media asset in outputting the supplemental media asset.

Inputting a primary media asset, accessing supplemental content logic, and outputting a supplemental media asset may be performed electronically.

The information distribution system may be a content-based messaging system, and the routing information may includes the primary content metadata.

In another general aspect, a system for delivering content may include a message reader operable to monitor an information distribution service and input therefrom a message being sent from a sender to a recipient. The system may also include a supplemental content selector operable to analyze the message and determine a subject matter of the message and routing information associated with the message, and generate supplemental content that is supplemental to the subject matter, and a transmitter operable to transmit the supplemental content to the recipient based on the routing information.

The message reader may be further operable to select a topic for supplemental content, and monitor the information distribution service to thereby determine that the message is related to the topic.

The message reader may be subscribed to a channel of a channel-based subscription service, wherein the channel corresponds to the topic. Additionally or alternatively, the message reader may be subscribed to a content-based messaging system, and operable to selectively input the message based on a relation between a content of the message and the topic.

The message may contain message metadata characterizing individual elements of content of the message, and the supplemental content selector may be operable to generate the supplemental content based on the message metadata.

The transmitter may be further operable to send the supplemental media asset via the information distribution service.

The routing information may be an email address, or channel-subscription information.

The information distribution system may be a content-based messaging system.

The routing information may be supplemental content metadata characterizing individual elements of the supplemental content.

The supplemental content selector may specialize in a particular subject matter of supplemental content.

In another general aspect, in an apparatus including a storage medium having instructions stored thereon, the instructions may include a plurality of code segments. A first code segment may be for reading a message from an information distribution service. A second code segment may be for determining a subject matter of the message. A third code segment may be for generating supplemental subject matter that is relevant to the subject matter, and a fourth code segment may be for transmitting the supplemental subject matter via the information distribution service.

The first code segment may include a fifth code segment for determining a destination of the message.

The fifth code segment may be for determining the destination based on an email address associated with the message. Additionally or alternatively, the fifth code segment may be for determining the destination based on channel-subscription information associated with the message.

The instructions may also include a sixth code segment that may be for transmitting the supplemental subject matter to the destination.

The message may contain message metadata characterizing individual elements of content of the message, and the second code segment may be for determining the subject matter of the message based on the message metadata.

The information distribution service may be a content-based messaging system.

The third code segment may include a fifth code segment that may be for comparing the subject matter to a predetermined topic, as well as a sixth code segment that may be for disregarding the message when the message does not correspond to the topic.

The fourth code segment may be for transmitting the supplemental subject matter based on metadata characterizing individual elements of a subject matter of the message.

In another general aspect, a system for delivering content may include means for monitoring messages on an information distribution service, means for determining a subject matter of each of the messages, means for generating supplemental content, the supplemental content including supplemental subject matter that is relevant to the subject matter of at least one monitored message, and means for sending the supplemental subject matter to a recipient of the monitored message.

The details of one or more implementations are set forth in the accompanying drawings and the description below. Other features will be apparent from the description, the drawings, and the claims.

DESCRIPTION OF DRAWINGS

FIG. 4 is a screenshot of the portal page of FIG. 3 and that includes supplemental content.

FIG. 14 demonstrates an article 1400 used in one implementation of the system.

DETAILED DESCRIPTION

Figure 1:
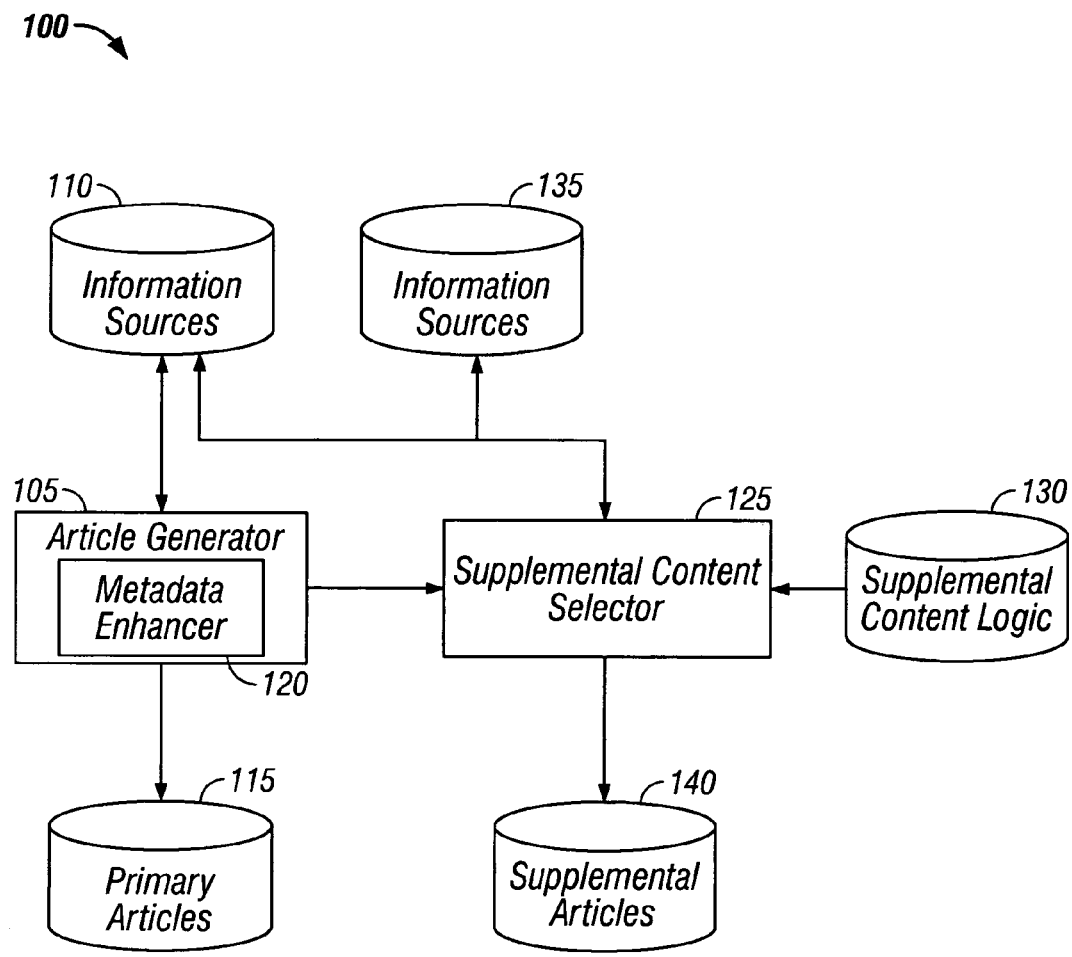
FIG. 1 is a block diagram of an article generation system.

FIG. 1 is a block diagram of an article generation system 100. In FIG. 1, an article generator 105 interacts with information sources 110 to publish articles to a database 115. Sources of information for articles might include an application's application program interface ("API"), an on-line analytical processing ("OLAP") server, a private or public database, and the World-Wide Web (perhaps queried through the hypertext transfer protocol ("HTTP"), simple object access protocol ("SOAP"), or other common protocols of the Internet).

Article generator 105 may utilize various techniques for gathering and publishing information as discrete articles. For example, article generator 105 may utilize software agents to gather appropriate information (agents are generally defined as automatons running on a scheduled basis and querying a data source for information and either producing or not producing content based in part on the result of that query).

The use of the term "article" in this context generally refers to a discrete collection of information that may include content and information about the content. Information about the content may include high-level attributes of the article, such as its author or general subject heading (for example, sports or weather). The information about the article also may include portions of the actual content itself used to articulate content metadata, perhaps in the form of "discussion objects."

In general, discussion objects are considered to be conceptual or tangible objects that are mentioned (discussed) as part of an article. This may include words, phrases, graphics, sequence of notes in an audio file, or some other aspect of the content of the article. Similarly, "discussion classes" are the types, or categories, of discussion objects. For example, an article about a discussion class of "computer manufacturers" may mention discussion objects "Intel" many times, while only mentioning "Dell" infrequently. Discussion objects and/or discussion classes may be categorized within a particular article as, for example, primary or secondary with respect to that article. Also, discussion objects and/or classes may overlap to some extent with the high-level attribute information.

Articles may be, for example, text, video, audio, Hypertext Markup Language ("HTML") files, or another available rendering medium, or a combination of two or more of these media. Articles may contain the same piece of content in multiple forms, and may permit generation of one type of content from another, as discussed below.

Therefore, an article may also be referred to as a "media asset," message, or another similar term describing such information to be passed on to a user. Content of an article may include a publicly-available web page (or portion thereof), an internal electronic mail, an individual's personal contact information, weather information, or a set of stock quotes. Content also may be obtained from specific applications, such as a profit and loss report of a company, an OLAP report, a "print-out" of a sales order, or many other examples of discrete pieces of content to be made available to the user(s).

In FIG. 1, some articles may already include attribute and content metadata information. If a particular article has no associated metadata, a metadata enhancer 120 may be used to examine the content of the article and generate metadata accordingly. Even if some information, such as attribute information or content metadata, is included with an article, metadata enhancer 120 may be used to further enhance the article by providing content metadata (or additional content metadata if some content metadata already exists).

Various object models may exist for describing how the content metadata should be generated, characterized, and interpreted. An object model includes a definition of permissible discussion objects and the classes to which these objects belong. These object models may differ in different contexts; for example, Intel might be a "customer" to one enterprise and a "supplier" to another. Multiple object models can therefore be implemented in conjunction with a context of a particular article; that is, Intel might be characterized as both/either a customer and/or a supplier for a particular article.

Articles may be additionally output to a supplemental content selector 125. Supplemental content selector 125 analyzes the attribute information and content metadata associated with each article, and compares this information against a set of rules contained in a supplemental content logic database 130. Supplemental content selector 125 may then gather information from information sources 110 and/or 135 (that is, may use the information sources 110 available to article generator 105, as well as other information sources 135), and thereafter publish supplemental articles 140. In one implementation, the primary and secondary articles may be published in the Extensible Markup Language ("XML") or in HTML.

There may be many different rules that can be implemented as supplemental content logic. For example, one rule may state that supplemental content should always be generated for a particular company or other discussion object. Another rule may state that supplemental content should be provided for a particular discussion object if it is mentioned in some threshold number of primary articles in database 115. Other rules may be used, as discussed below and/or as would be apparent in a particular implementation.

Figure 2:
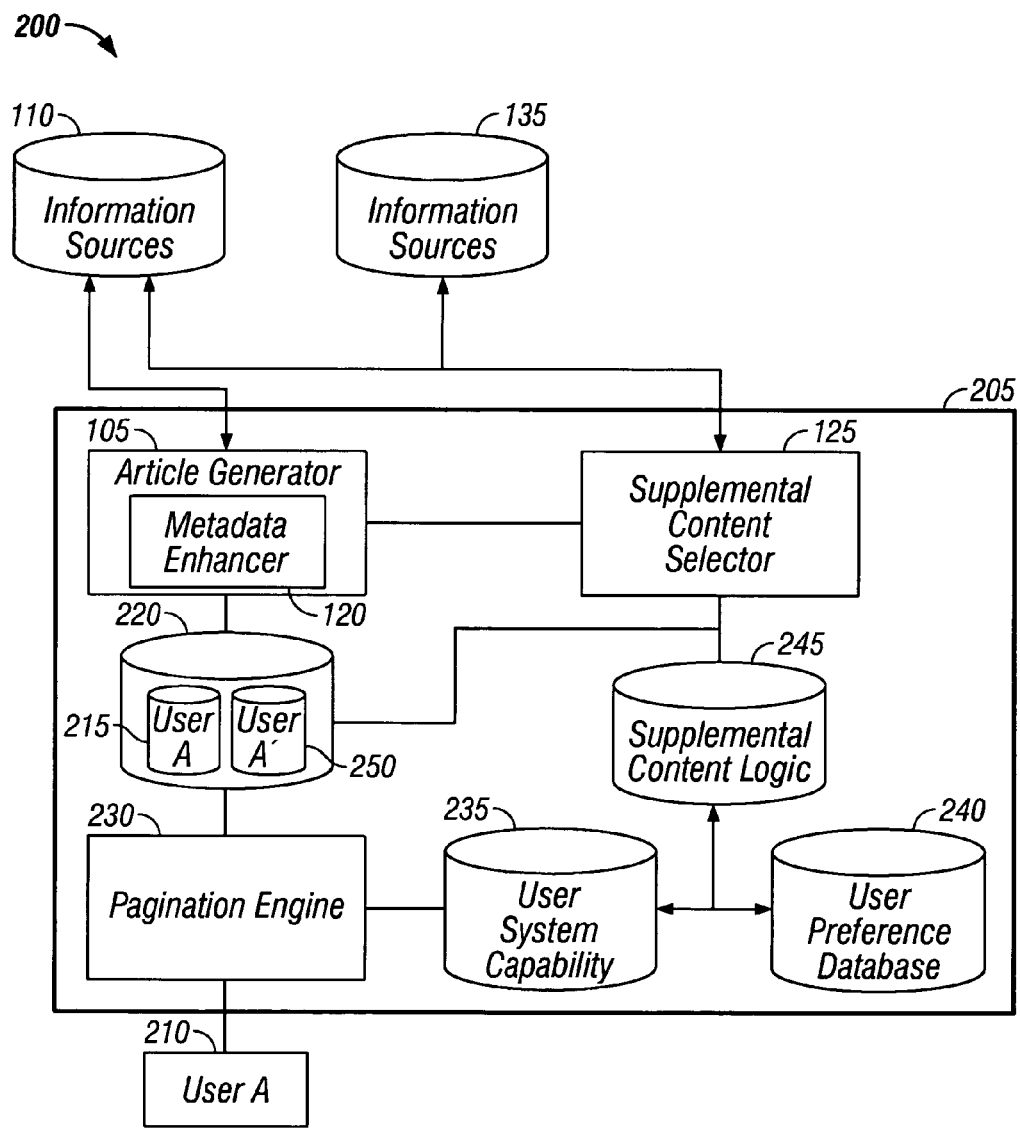
FIG. 2 is a block diagram of a system for delivering a portal having supplemental content to a user.

FIG. 2 is a block diagram 200 including a system 205 for delivering a portal having supplemental content to a user. System 205 might be, for example, an Internet server that is part of the World Wide Web. In FIG. 2, as generally described above, article generator 105 generates articles to be delivered to a user 210. For example, user 210 may be using a web-based browser for displaying a portal that includes a plurality of iViews, wherein each iView contains articles that are instances of a particular category. For example, an iView designated to contain "business" articles might contain an article about Dell Computers or General Electric Company ("GE"). The iViews can be arranged on a screen according to a preference of the user 210.

In this and related implementations, it should be understood that the term article could also be considered to extend to the entirety of the iView itself, even in the situation where the iView contains a plurality of different stories. That is, given that supplemental content is selected based on content of an iView, as explained in more detail below, all of the content generated by code associated with the iView (that is, the content of the iView), can be considered one article for the purpose of generating supplemental content therefrom.

It should be understood that articles generated by article generator 105 will not generally exist prior to a time that user 210 requests a portal page from system 205. That is, when user 210 logs onto system 205 and receives (and/or refreshes) a corresponding portal page, system 205 actuates article generator 105 and retrieves information from information sources 110 to formulate articles for delivery to user 210. This article generation may be as simple as obtaining a previously-written news article from an online newspaper, or it may be more complicated, such as accessing a database to withdraw requested data and compose a user-specific story from that data.

This technique of article generation should be differentiated from the technique of compiling a pool of articles before user 210 (or other users) even logs onto system 205. An example of a system that can compile articles for (and associate subsets of the articles with each of) a plurality of users before receiving a request from any of the users is discussed below, and is described in detail in U.S. application Ser. No. 10/231,440, titled "Dynamic Presentation of Personalized Content" and filed Aug. 30, 2002, and in U.S. application Ser. No. 10/231,459, titled "Rich Media Information Portals" and filed Aug. 30, 2002, which are each incorporated by reference for all purposes.

In other words, it should be understood that the difference between a portal system, as that term is used herein, and the systems in the above-referenced disclosures, is that the former type of systems are generally "query" systems, in which data is obtained in a reactive manner. That is, data is generally obtained only after a user (or other) request, and based on the request. In contrast, the latter types of systems are generally "reverse-query" systems, in which data is obtained proactively (for example, on a periodic basis), prioritized with respect to a particular user, associated with the user and stored for delivery to the user if and when that user logs onto the system.

In FIG. 2, articles generated by article generator 105 are shown to be stored as primary articles in a database 215 within a larger database 220. It should be understood that such storage is typically merely a caching of articles in the event that one or more of the articles may be requested again in the near future, and, consistent with the explanation of a "query" system 205 just given, these articles are not associated with a particular user, but rather are available in response to any user who might request one or more before the article(s) expire from the cache. Articles shown as being stored in primary articles database 215 need not be stored at all, and could simply be delivered to user 210 via a pagination engine 230, and re-generated later on an as-needed basis.

Pagination engine 230 is generally used to describe a portion of system 205 that interacts with user 210 to receive a request, a user preference, and/or a system capability (where the user preference and the system capability may or may not be part of the request). Pagination engine 230 may then act to deliver a portal page and associated iViews (having category-appropriate articles contained therein) to user 210, with the iViews being arranged in a manner determined by user 210 during an initial portal set-up.

The user system capabilities may be stored in a user system capability database 235, and the user preferences may be stored in a user preference database 240. It should be understood that user preference database 240 is generically used to refer to an ability of system 205 to store any user preferences. For example, user preference database 240 may store information used by article generator 105 to generate primary articles. User preference database 240 may also store the user-determined layout or arrangement of the iViews on the user's portal page.

User preference database 240 may also store preferences of the user 210 with respect to supplemental articles. Thus, data stored within user system capability database 235 and user preference database 240 may be used by supplemental content selector 125 in conjunction with other information stored in a supplemental content logic database 245 to generate articles that supplement the primary articles generated by article generator 105. The supplemental articles, similarly to primary articles, may be cached in a database 250 within database 220, or may be generated on an as-needed basis (and therefore not cached at all).

As discussed above with respect to FIG. 1, supplemental content selector 125 may generate supplemental articles from the same information sources 110 used by article generator 105, or may access other information sources 135. Supplemental content selector 125 generally generates supplemental content based on attributes and content metadata of the primary articles. Content metadata may be included with the primary articles through, for example, the operation of metadata enhancer 120.

In one implementation of system 205, supplemental content selector 125 may generate supplemental content based simply on the appearance of a particular topic or subject in articles output by article generator 105. In other implementations, the supplemental content selector 125 may be more specific to user 210 than simply specifying a particular topic or subject. For example, the supplemental content selector 125 may select supplemental content based on supplemental content logic 245, where supplemental content logic 245 includes rules that are personalized to each of a plurality of users, including user 210.

Figure 3:
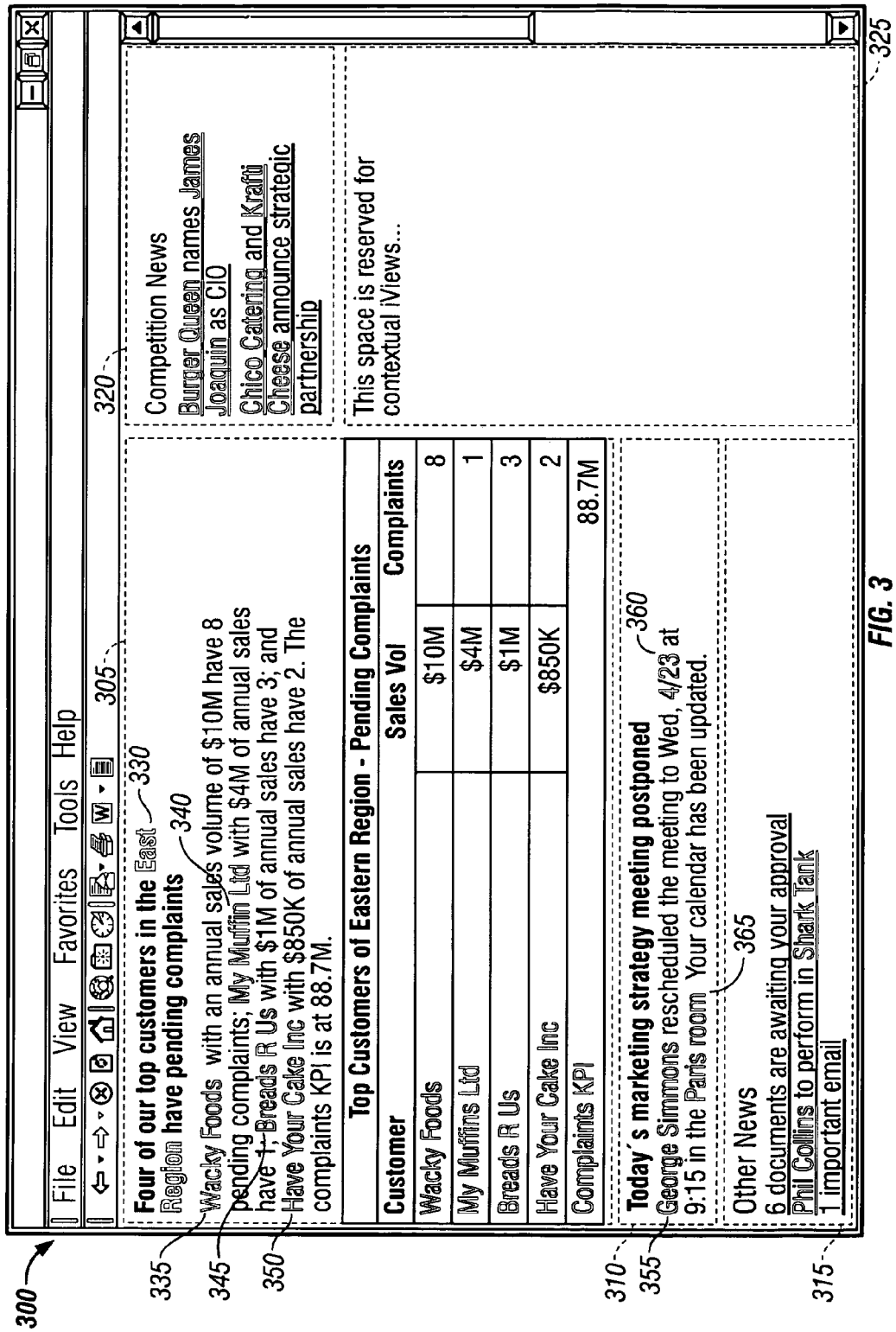
FIG. 3 is a screenshot of a portal page that may be generated by the system of FIG. 2.

FIG. 3 is a screenshot 300 of a portal page that may be generated by system 205. The screenshot 300 of FIG. 3 assumes, for the sake of example, a scenario in which system 205 is being deployed in an enterprise environment, that is, in which an enterprise utilizes system 205 as part of its company network to provide relevant information to its employees. However, it should be understood that such a scenario may include access by the system 205 of external sources of information, such as sources on the Internet. It should also be understood that system 205 may be deployed via a public, as well as a private, network.

In FIG. 3, a first iView 305 has previously been designated by user 210 to contain information about the category "customer information." Accordingly, in this example, iView 305 contains an article about customers of the enterprise. More specifically, iView 305 happens to contain information about which important customers in a particular region have pending complaints with the enterprise.

Based on the explanation above with respect to FIG. 2, it should be understood that the article (that is, the content) within iView 305 did not necessarily exist before user 210 logged onto system 205. That is, customer information existed in list form in a company database, but the specific article about which of the customers in a particular region have pending complaints did not exist until user 210, having iView 305 designated for "customer information," logged on. The article in iView 305 may be specifically generated for the "customer information" iView 305, may be based on more specific user preferences about what type of customer information to display, what region to limit the report to, or (though not shown in FIG. 2) may be generated based on specifications of the enterprise as to what will be shown to employees on a company portal page.

Similar comments apply to other iViews shown in FIG. 3. Specifically, an iView 310 may be a "calendar" iView for displaying scheduling information specific to user 210, such as details of an upcoming meeting. Again, iView 310 will contain an article created to have timely relevance to user 210; that is, if user 210 has logged onto system 205 after the meeting referred to in iView 310, then that article might never have been generated, and another article about a still-pending meeting might have been generated by article generator 105. An iView 315 is an "other news" or miscellaneous iView for content not fitting into a particular category, and an iView 320 contains content about enterprises that compete with the enterprise deploying system 205. In the cases of iViews 315 and 320, content may be pre-composed by an external source, emails addressed to user 210, work documents of user 210 stored on a database of the enterprise, or other information available in information sources 110.

Finally, in the screen shot 300 of FIG. 3, a space or subsection 325 represents space reserved for contextual iViews, that is, content generated by supplemental content selector 125. This space may contain one iView or a plurality of iViews, and the content of these supplemental iViews may vary based on articles within primary iViews 305, 310, 315, and 320, where primary iViews may be considered a first space or subsection for primary articles (content). For example, the content of the supplemental iViews may vary based on the content of the primary articles.

Articles within the various iViews each contain content metadata, as explained above with respect to FIG. 2. In the article of iView 305, for example, discussion objects include "East Region" 330, "Wacky Foods" 335, "My Muffin Ltd" 340, "Breads R Us" 345, and "Have Your Cake Inc" 350. Similarly, the article of iView 310 contains discussion objects "George Simmons" 355, "4/23" 360, and "Paris room" 365. Each of these discussion objects may be classified as part of a specific class or category, for example, "Wacky Foods" 335 may be classified as a "company" and/or a "customer." These classifications are made according to a pre-determined object model, perhaps implemented by metadata enhancer 120, and may be incorporated into, for example, an XML or HTML message that contains the information for the relevant article(s). In this way, as described above, supplemental content selector 125 may generate supplemental articles based on the content of primary articles.

Discussion objects may be identified in the content of an article by displaying them in a different color than remaining text, highlighting them, underlining them, or using another technique for identifying them to user 210. On the other hand, discussion objects could simply be incorporated into the article as metadata, without explicitly identifying them visually in the content at all.

FIG. 4 is a screenshot 400 of the portal page of FIG. 3 having space 325 filled with supplemental content. Specifically, FIG. 4 includes a supplemental iView 405 that contains stock market information, including current stock quotes for each of the companies 335, 340, 345, and 350 identified in the article of iView 305. An article in a supplemental iView 410 displays information about the discussion object 355, "George Simmons."

It should be understood that, in conventional systems, a user would not expect to see, and indeed would not see, the supplemental information about George Simmons; that is, such information is different from what the types of information the user selected for receiving when setting up the primary iViews. Thus, the supplemental information may be a valuable tool for gaining the user's attention with respect to a particular topic. Given that supplemental content will often be generated for the most important articles/content within the primary iViews, the user's attention will thus be drawn to the more important articles/content, as well. For example, the supplemental article about George Simmons in this example, may allow or remind user 210 to contact George Simmons regarding the meeting discussed in the article of iView 310.

The amount of space 325 reserved for supplemental content, and/or a number of iViews to be included in space 325, may be determined by user 210. In iView 410, content about only one discussion object ("George Simmons" 355) is included. However, more than one discussion object can be included in each article within supplemental or contextual iViews 405/410. For example, in iView 405, content about each of the discussion objects 335, 340, 345, and 350 is included.

Since space is limited for inclusion of supplemental content, and as referred to above, various rules may be included in supplemental content logic database 245 for determining what content is generated by supplemental content selector 125 for inclusion in space 325. For example, supplemental content selector 125 may use a priority system to determine iView categories and/or discussion objects for which to generate supplemental content. Such priorities may be determined, for example, by user 210 and/or the enterprise deploying system 205.

Supplemental content selector 125 may also examine a particular discussion object to determine, for example, how often it is mentioned in a particular primary article(s). If the discussion object is mentioned a certain number of times, it might be prioritized as a basis for supplemental content.

In short, system 205 may be used to include supplemental content in the context of an otherwise-conventional portal environment. Users may thus be provided with information (that is, the supplemental information) that may be useful or interesting to them, in addition to information provided in conventional portal environments.

Figure 5:
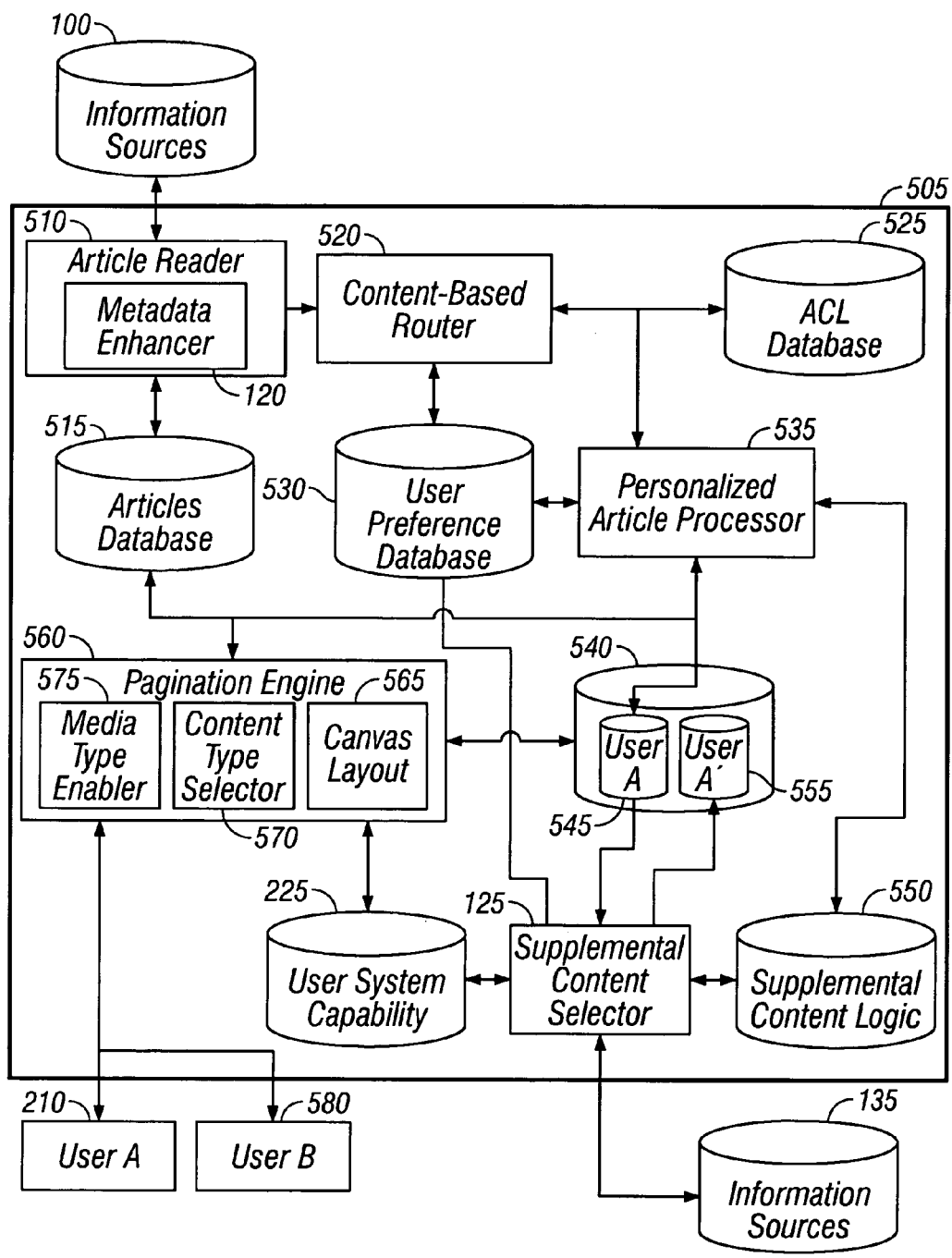
FIG. 5 is a block diagram of a system for delivering dynamic personalized content in conjunction with supplemental content.

Supplemental content selector 125 may also be used in contexts outside of conventional portal environments. For example, FIG. 5 is a block diagram 500 of a system 505 for delivering dynamic personalized content in conjunction with supplemental content. In FIG. 5, an article reader 510 may obtain articles or other information from information sources 110, generate metadata, as needed, with metadata enhancer 120, and store the articles in an articles database 515. Although element 510 is described as an article reader, as opposed to an article generator 105, it should be understood that, as explained above, an article generator typically compiles an article based on content in a database and in response to a user request, whereas article reader 510 may assemble articles prior to a specific user request. However, the functionalities of the article generator 105 and article reader 510 may overlap in a given scenario.

Information referencing the articles is passed on to a content-based router 520. Although entire articles could be passed through the system 505, other techniques may be used. For example, only links to corresponding articles need be circulated through system 505, with the articles themselves remaining stored in database 515. As another example, such links may be circulated with the associated attribute and/or content metadata, but without the content itself; in this way, the article may be processed (as discussed below), without actually having to circulate the article in its entirety.

Content-based router 520 examines each article with respect to its content, associated attributes, and/or content metadata, for example, discussion objects, and compares this information to information stored for individual users. For example, an Access Control List ("ACL") database 525 contains a security clearance for each user with respect to various subjects, so that a user who is not cleared to receive certain information within an article will not receive that article. A user preference database 530 contains information about each user, for example, the extent to which a user likes or dislikes a particular subject, or the type of device(s) on which the user may be receiving the articles.

A router capable of routing articles based on content as described herein may be built and/or utilized to implement system 505. One type of router that is capable of performing the functionality of content-based router 520 is known as Elvin and is produced by the Distributed Systems Technology Centre (DSTC). The DSTC is an Australian-based joint venture supported by the Australian Government's Cooperative Research Centres Program and over 24 participating organizations, and intended to develop enterprise infrastructure(s). Other types of content-based services include Gryphon, produced by IBM, and Keryx, a Java-notification service by Hewlett Packard.

User preferences for populating user preference database 525 can be obtained by a number of techniques. For example, the preferences could be gained by asking users to fill out a preference form before gaining access to system 505. As another example, the preferences can be modified over time by obtaining feedback from the users.

By accessing databases 530 and 525, content-based router 520 is able to filter articles that are restricted from or are of no interest to a particular user. The action of content-based router 520 thus eases the burden on a personalized article processor ("PAP") 535, which has the job of individually prioritizing the remaining articles. The prioritization may be based on a comparison of contents of the user preference database 525 to the content and to the content metadata/ attributes of each article. Accordingly, individually-sorted articles may be stored in a sorted articles database 540, where articles for user 210 are stored with their corresponding priority information for that user in database portion 545. The priority information may be associated with an article by, for example, storing the information in a table or storing articles in a prioritized order.

Articles in database 545 may thus be presented to a user, as discussed in more detail below. Additionally, supplemental articles may be generated by supplemental content selector 125 operating in conjunction with user system capability database 225, user preference database 525, and a supplemental content logic database 550 (and possibly with ACL database 530, connection not shown). The supplemental articles may be stored in database 555.

A pagination engine 560 may thus gain access to two sets of articles associated with, and prioritized with respect to, an individual user. Pagination engine 560 will typically have access to characteristics of the client system being used by each user, which may be stored in user system capability database 225, or determined from the user request at the time of the request.

Pagination engine 560 determines a layout of the canvas being used by each user, using a canvas layout subsystem 565. In this context, the term "canvas" includes any rendering media in which articles may be presented. Canvas examples include web pages (on desktop computers, laptops, Personal Digital Assistants ("PDAs"), web-enabled cell phones, etc.), audio (for example, cell phone or radio), video (for example, television or Motion Picture Expert Group ("MPEG") player), or another type of device capable of receiving content within an article and presenting it to the user.

Since, as a practical matter, a canvas will typically have capacity limitations, one of the services of the canvas layout subsystem 565 within pagination engine 560 is to determine how much "space" is available to the user for displaying articles. For example, a web browser on a PDA typically will be able to display a smaller number of articles than a browser on a desktop computer. As another example, a user who receives audio articles via cell phone or radio only may have twenty minutes during a car ride during which to listen to articles. In short, canvas layout subsystem 565 determines any user-specific capacity constraints when deciding which articles to provide to a given user.

A content-type selector 570 determines which rendering media are available to the user for the selected canvas, and which articles are consistent, or can be made to be consistent, with that media. For example, content-type selector 570 may determine that a canvas has audio and HTML capabilities, but not video.

Finally within pagination engine 560, a media-type enabler 575 is available to enable a rendering media that would not ordinarily be available to the user (based on the content type(s) of the articles), when feasible and desired. One example of this feature is the capability of reading aloud to the user an email that is included as an article. Another example is the generation of an animation of a newscaster, complete with moving lips, to read aloud a print story to the user.

For example, content-type selector 570 may determine from user system capability database 225 that a system for user 210 has audio capability. Pagination engine 560 may then determine from user preference database 525 that user 210 prefers to have text content read to him or her, rather than having the text content displayed on a screen. Pagination engine 560 may then use media type enabler 575 to convert the text content to an audio format.

During a final portion of the pagination process, pagination engine 560 aggregates the selected articles, in their selected formats, and delivers a personalized "page" of information to the user 210, so that the user 210 receives articles for rendering that are of the most interest to him or her at a given point in time (or that the system determines the user should/must see, even if the user has expressed non-interest in such an article, such as a direction from the user's boss, or an article about a "hot" topic of the day). Here, it should be understood that a page refers to the aggregated articles, regardless of the rendering method. A system(s) of user 210 may thus receive information suitable for rendering a page of information consistently with the user's respective system capabilities and requirements.

System 505 may also receive feedback from a user to be recorded in user preference database 525, so that the pages increasingly become better-personalized to each user as time goes by.

System 505 may be implemented in an enterprise environment, as discussed above, for the convenience of employees and/or customers of the enterprise. Implementations may be utilized via various other private networks, such as, for example, a university or other school network. Implementations, additionally or alternatively, may be provided to members of the public at large, via the Internet.

It should be understood that the system 505 may thus provide dynamic, personalized content to the user 210, and that this content may be supplemented with supplemental content that is selected based on the personalized content. This implementation has various differences from the implementation described above with respect to FIGS. 2-4. For example, in the implementation of FIG. 5, the articles are pre-assembled for user 210, based on information about the user 210. The articles can thus be prioritized and/or filtered for relevance with respect to user 210, so that user 210 receives articles that will be of most interest to him or her.

Thus, in the implementation of FIG. 5, the various sections of the screenshots 300 and 400 of FIGS. 3 and 4, respectively, need not be iViews having pre-determined categories. Rather, the content and placement of the sections 305, 310, 315, 320 and 325 could be dynamically determined based on the available articles and their respective prioritization/filtering status. In other words, in the implementation of FIG. 5, the sections of screenshots 300 and 400 of FIGS. 3 and 4 represent pre-assembled articles that are not (necessarily) generated by the system 505 at the time of a user request. Again, this approach allows placement, sizing, and selection of content (and content type or category) in a customized and dynamic manner that is not generally available in the implementation of FIG. 2.

In conjunction with the above-described features of the implementation of FIG. 5, supplemental content can be selected and presented in a variety of ways. For example, if the supplemental content is selected from articles already available in database 545, then supplemental content selector 125 may be able to use the associated prioritization information to better select supplemental content.

Another selection option includes supplemental content selector 125 selecting supplemental content only for articles having a certain priority level, or only for articles having the highest priority level. Similarly, another presentation option includes the ability to re-size the space 325 reserved for supplemental content, as needed. For example, if user 210 specifies that supplemental content is only desired for one discussion class, such as "Company News," and there is little or no company news to be shown in a current rendering for the user 210, then the space 325 may be reduced or removed, so that other articles may be included in that space. Other selection and presentation options exist for including supplemental content in the implementation of FIG. 5, using the information available via PAP 535, as would be apparent.

Additionally, supplemental content selector 125 need not select supplemental articles only from among the non-presented articles in database 545. Rather, supplemental content selector 125 may access the entire article pool stored in database 515, or may access external information sources 135 (or 110, connection not shown). In such cases, supplemental content selector 125 may generate articles in the manner described with respect to article generator 105 in FIG. 2, at the time of a user request or as the fulfillment of a pre-determined rule. This article generation may be based on prioritization/filtering information of articles in database 545, or may be based on some other selection criteria specified by the user. In this implementation, articles need not (but could) be stored in a database 555, and space 325 may be reserved for (static) iViews (even while remaining portions of the screen may have the dynamic, personalized nature described above and enabled by the implementation of FIG. 5).

Also in the implementation of FIG. 5, it should be understood that database 540 may include a plurality of users, where each user-designated database portion might have supplemental articles associated therewith.

Finally with respect to FIG. 5, it should be understood that system 505 may by used to generate content that is not restricted to a web page. Rather, as referred to above with respect to pagination engine 575, content may be stored as video, audio, text, or any other format compatible with a particular article and a system of user 210. System 205 of FIG. 2 might also utilize the ability to store various types (media) of content by incorporating some of the functionality of pagination engine 560 in pagination engine 230 (discussed below with respect to FIG. 6), although pagination engine 230 would not require the aggregation functionality of pagination engine 560 (since pagination engine 230 would not generally be sizing or placing portions of a canvas-in the same sense as pagination engine 560, which may use, for example, prioritization information).

Figure 6:
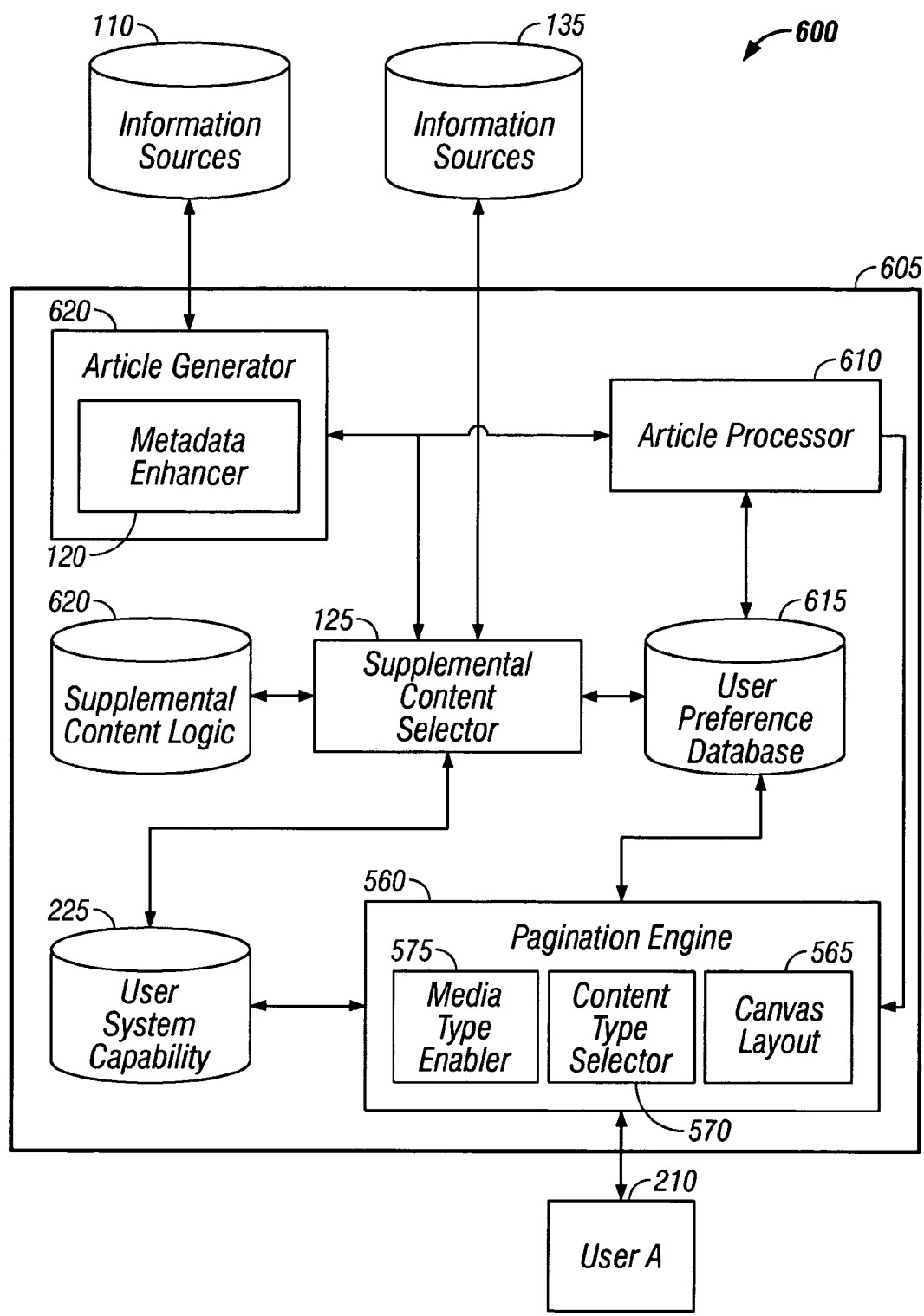
FIG. 6 is a block diagram of a rich-media content delivery system incorporating a supplemental content selector.

FIG. 6 is a block diagram 600 of a rich-media content delivery system 605 incorporating supplemental content selector 125. More specifically, system 605 represents an implementation that includes pagination engine 560 and its associated functionality, but in a portal environment. That is, system 605 is capable of generating content based on a user request, and does not generally store articles prior to the request. In this sense, system 605 is more similar to system 205 than system 505.

In other words, in system 505, as just explained, articles may be collected in a pool (and prioritized/filtered), stored in a database, and associated with a user all prior to a specific user request. The articles then may or may not be aggregated in a rich media setting (that is, a setting that includes the possibility of incorporating various types of media in a content delivery).

In FIG. 6, an article processor 610 associates articles with particular users, using a user preference database 615. This association may occur by virtue of content metadata such as discussion objects contained within the articles, as discussed above, or may occur by virtue of a comparison of general article attributes and/or content to user preferences. An article generator 620 generates articles based on information in information sources 110. Article generator 620 may or may not include metadata enhancer 120, and may or may not store the articles separately (although the articles could be cached for possible later use, as is referred to above).

It should be understood that article processor 610 is a simple processing engine for associating iViews/articles to be generated based on a user request, and does not require the capabilities of content-based router 520 and/or personalized article processor 535 shown in system 505 of FIG. 5. Also, in contrast to personalized article processor 535 (which processes article only after they are read by article reader 510, article processor 610 generally performs its (associating) functionality prior to generation of an article by article generator 620.

Pagination engine 560 communicates with both article processor 610 and user system 210. Pagination engine 560, as already described, will typically have access to characteristics of the client system being used by each user, determined either from user preference database 615, user system capability database 225, or from the user request at the time of the request.

In this way, pagination engine 560 determines a layout for the canvas being used by each user, using canvas layout subsystem 565. As described above, one of the services of the canvas layout subsystem 565 is to determine how much "space" is available to the user for displaying articles, as well as any other user-specific capacity constraints relevant to deciding which articles to provide to the user(s).

Content-type selector 570 may then determine which rendering media are available to the user for the selected canvas, and which articles are consistent, or can be made to be consistent, with that media. Media-type enabler 575 is available to utilize a type of media that would not normally be available to the user.

In the implementation of FIG. 6, article selection and layout may be determined essentially as is done in the context of traditional portal technology (that is, pre-determined, categorized canvas sections such as iViews), or may, for example, incorporate any or all of the advantageous features of system 505. In either case, system 605 serves to provide personalized audio and/or video presentations above and beyond the context of traditional browser-based technologies. User preferences as to which media type is preferred may be stored in user preference database 615, or may be included with a request from user 210.

Thus in FIG. 6, supplemental content selector 125 may access supplemental content logic 620, user system capability database 225, and user preference database 615, to thereby generate supplemental content to be delivered to user 210.

In short, FIG. 6 demonstrates a system similar in concept to that of FIG. 2, but that explicitly demonstrates an ability to use multimedia in delivering content. For example, system 605 could generate content in the form of an audio file, which might be accessed via a cell phone or a radio. In the audio file, the last twenty percent might be saved for supplemental content. Similarly, system 605 could generate a video file for delivery via a television, such as a closed-circuit television, and, again, some portion of the video file could be saved for supplemental content.

In one implementation, rich media is made available to systems 505 and 605 by incorporating various content-types within content blocks within the article, each content-type conveying similar information and having at least some segment of the content. See, for example, the article in FIG. 14, which is discussed in more detail below with respect to that drawing. As another example, an article might have one content block having an HTML chart, a second content block having a video file, a third content block having an audio file, and a fourth content block having a text file. In this way, pagination engine 560 (specifically, content-type selector 570) can select the appropriate content type for a given user and a given article.

In short, system 205 of FIG. 2 is an example of providing supplemental content in a web-based portal environment. FIG. 5 is an example of supplemental content in a highly-personalized, dynamic, rich-media content delivery system for delivering pre-assembled articles. Although system 505 of FIG. 5 may also utilize some of the concepts of system 205, for example, inclusion of supplemental iViews in an otherwise dynamically-assembled delivery package, system 205 differs in that there is more of a direct connection between an actual publisher of information and user 210 than in system 505 (in which system 505 is more of an intermediary between a publisher and a user). Finally, FIG. 6 is an example of a rich-media content delivery system along the lines of the web portal shown in FIG. 2, that may provide more of a direct connection between publisher(s) and user(s), and does not require the pre-assembly of articles in the manner of FIG. 5.

Figure 7:
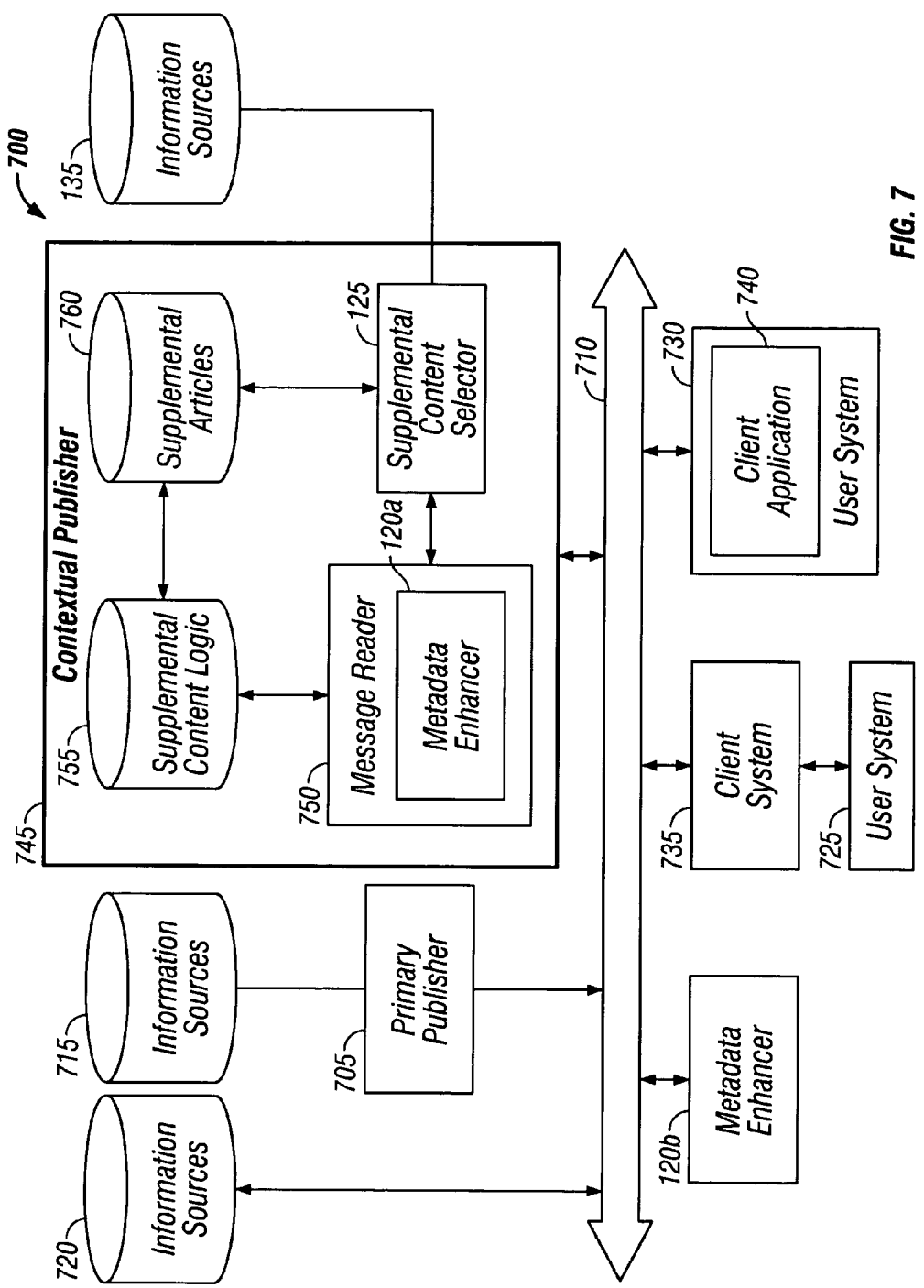
FIG. 7 is a block diagram of a supplemental content selector in a publish/subscribe infrastructure that includes an information distribution source.

FIG. 7 is a block diagram 700 of supplemental content selector 125 in a publish/subscribe infrastructure that includes an information distribution source. In FIG. 7, a primary publisher 705 publishes articles to an information distribution service, or "wire" 710, based on content obtained from information sources 715 and/or 720.

The term wire originates as a reference to distribution services used by news services such as the Associated Press ("AP"), which publishes news stories to be distributed nationally and used by national and/or local paper. In the context of this description, the term wire may refer to many different types of information distribution services. For example, the wire 710 may be a collection of servers connected thru computer networks, and perhaps sending/receiving HTML, XML, simple text, and/or other types of content. Such servers may support the functionality of wire 710 by means of specialized software, such as a messaging system like Java Messaging Service ("JMS").

Generally speaking, wire 710 may refer to any separation layer between the publishers and clients receiving published content. Wire 710 could thus be a bus (for example, JMS or Elvin), or could simply be a file system or a table in a database. Wire 710 could also simply be the Application Program Interface ("API") to a publishing system, or simply an electronic mail ("email") inbox.

In short, wire 710 may be an information distribution service that supports publishing articles and/or messages, receiving the articles/messages, listening for specific types of articles/messages, and selectively receiving specific types of article/messages thereof. Additionally, the term "stream" may be used to represent a flow of articles, messages, or other information on the wire.

Generally speaking, a characteristic of a messaging system such as wire 710 is a separation between a sender such as primary publisher 705 and a recipient. The structure of the messages is such that any client connected to the wire 710 can easily create a message and transmit it over the wire 710. In order for the sender to send a message to the recipient, the sender may utilize, for example, a direct address of the recipient. However, it is not necessary that the sender know such a direct address. For example, in the case of content-based messaging (discussed in more detail below), the sender need not know where or even who the recipient is; rather, the sender may merely send messages over wire 710, and trust that the wire 710 will, based on the content of the messages, ensure that users interested in such content will actually receive the messages.

Thus, the wire 710 may act as a mediator between senders and recipients. This layer of separation enables several advantageous features in the system of FIG. 7. For example, messages can be sent from senders to recipients even if the recipients are not currently connected. As a second example, delivery can essentially be guaranteed, inasmuch as the wire 710 may store all of the messages until delivery is confirmed. As a third example, new parties can easily join in; for example, the system API may be the same for all parties. As a final example, messaging can be performed anonymously; that is, senders need not know exactly who is going to read their content. Similarly, recipients do not know exactly who is going to send them content after they create a subscription to the wire 710. In this case, only when recipients receive a message will they know who it was from.

Various techniques exist for routing messages on a wire. First, in direct addressing, each recipient has a unique address. Publishers who want to send content to that recipient need to know this address. Email systems are an example of such a system.

Second, in channel-based addressing, recipients may subscribe to a channel or to a family of channels. Publishers send content to channels, not to recipients directly. This provides for means to multi-cast messages to multiple recipients who expressed interest in a specific topic. A good example is a newsgroup, where people may join and thereafter receive all emails addressed to the group as a whole. In addition, users may opt to unsubscribe from the group.

As a final example, content based messaging (CBM) allows recipients to describe their subscription based on the content of the message. A recipient specifies that he would like to receive messages only if they contain something specific. This provides for the ultimate separation between senders and recipients. Senders simply broadcast their messages, which thereafter get routed only to interested consumers. As referred to above in the context of FIG. 5, various content-based routers exist which enable this type of messaging.

In any of the above-described messaging schemes, messages may reach users such as a user 725 and/or a user 730 via wire 710. Since the messages will often be in a format (for example, an XML file) that may be unreadable to an average human recipient, it may be necessary to include client systems 735 or 740. As shown in FIG. 7, such client systems may be external to the user systems, as with client 735, or may be an application running on the user system, such as with client 740.

Clients 735 and/or 740 may be capable of rendering the messages in a format suitable for use by users 725 and 730, respectively, and in accordance with the client's capabilities. For example, client application 740 running on user system 730 may be an application designed simply to render text of a message to the user, perhaps as a "ticker" at the bottom of a screen of the user. In contrast, a more complex client system such as client 735 may be able to render messages in a plurality of formats to a plurality of users. Examples of client system 735 are discussed below with respect to FIGS. 12 and 13.

Contextual publisher 745 also may act as a client or subscriber to wire 710. Contextual publisher 745, unlike primary publisher 705, does not generally initiate generation of new content. Instead, contextual publisher 745 eavesdrops on the wire 710 for information that it recognizes, and for which it has (or can generate) relevant information. When such information is recognized, the contextual publisher 745 accesses or creates a message that is related to the recognized information in some way, and publishes the accessed/created message on the wire 710, addressing the accessed/created message to the same user(s) identified in the original, eavesdropped message (that is, the recognized information).

Contextual publisher 745 generally contains a message reader 750 that monitors the wire 710 for articles in which the contextual publisher has expertise. That is, contextual publisher 745 can be regarded as an expert in a specific field or category, and will generally publish supplemental content when such supplemental content is, in fact, relevant to a particular article or message. This is represented in FIG. 7 by a connection between message reader 750 and a supplemental content logic database 755, which specifies the types of messages and/or subject matter that contextual publisher 745 should intercept.

Supplemental content selector 125, as generally described above, receives as to input supplemental content logic from database 755, as well as messages from message reader 750, and outputs messages back onto the wire. The supplemental messages may be accessed from/or generated using information sources 135. The supplemental messages also may be stored in supplemental articles database 760, so that contextual publisher 745 can transmit the messages more quickly the next time contextual publisher intercepts a related message from primary publisher 705.

In FIG. 7, message reader 750 is shown to contain a metadata enhancer 120a, which, as already described for metadata enhancer 120, assists the supplemental content selector in determining whether to intercept a message and/or generate a related message by adding content metadata to the message(s). This technique, however, may require contextual publisher 745 to intercept almost every message to enhance metadata before determining whether contextual publisher 745 should publish supplemental content. In another implementation, a metadata enhancer 120b can be alternatively or additionally provided on the wire and external to the contextual publisher, so that one metadata enhancer 120b may provide metadata for a number of contextual publishers, and so that the contextual publishers may therefore intercept only those messages already with metadata about which contextual publisher 745 has specific knowledge.

An example of a contextual publisher 745 might be one that listens on a news wire for articles (embodied as messages) regarding Standard and Poor ("S&P") 500 companies. Whenever one is detected, the contextual publisher 745 generates a new message with the stock quote for that company. Since the discussed company is in the news for a given day, it is likely that recipients of that original message will be also interested in the stock quote message as well.

Figure 8:
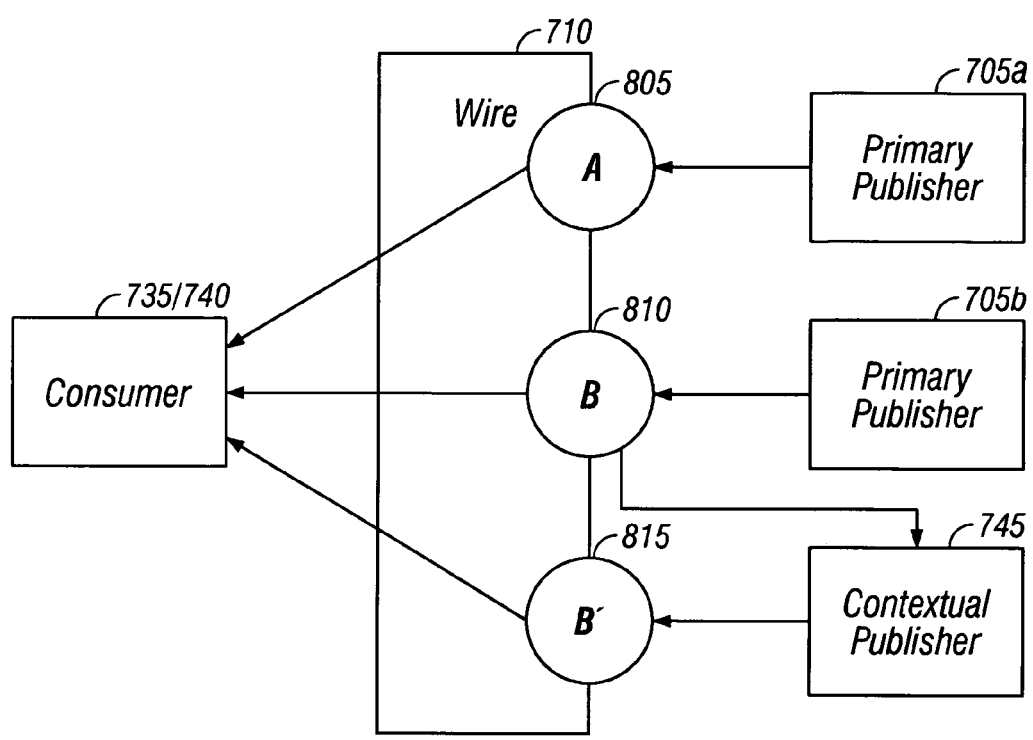
FIG. 8 is a block diagram of a supplemental content generation system.

FIG. 8 is a block diagram of a supplemental content generation system. In FIG. 8, two primary publishers 705a and 705b, one contextual publisher 745, and one consumer (which could be client application 735 or 740 associated with user 725 and 735, respectively) interact within an enriched information stream system sent via wire 710.

For the example of FIG. 8, it is assumed that the publishers 705a and 705b are using wire 710 to transmit messages to consumers (as opposed to more of a consumer-to-consumer scenario, which would also be possible). As described above, and depending on the messaging scheme utilized, publishers 705a and 705b need not know where the consumer 735/740 is at the moment of sending the message. It is enough that they know that the consumer is (or will be) connected to the wire, and that the wire has some technique for routing the message to the appropriate user(s). Again, such routing techniques may be, for example, direct addressing, channel-based subscriptions, or content-based messaging. In content-based messaging, no specific user address is needed; rather, the mere fact that a message having certain content is placed onto the wire should be sufficient to ensure that users interested in such messages will receive them.

Contextual publisher 745 may be thought of as a consumer and a publisher at the same time. That is, contextual publisher 745 both receives messages and sends new messages.

In FIG. 8, then, primary publisher 705a publishes a message A 805, which the consumer 735/740 receives via wire 710. Meanwhile primary publisher 705b publishes a message B 810, which the consumer 735/740 also receives. Contextual publisher 745 also receives message B 810, since contextual publisher 745 determines that message B 810 is a type of message with respect to which contextual publisher 745 has expertise and has (or can access or generate) supplemental messages. Contextual publisher 745 then publishes message B' 815 onto the wire. Since message B' 815 has content similar to message B 810, and/or because contextual publisher 745 is aware of routing information in message B 810 that results in consumer 735/740 being a recipient, contextual publisher 745 is also capable of forwarding message B' 815 to consumer 735/740 using wire 710.

Figure 9:
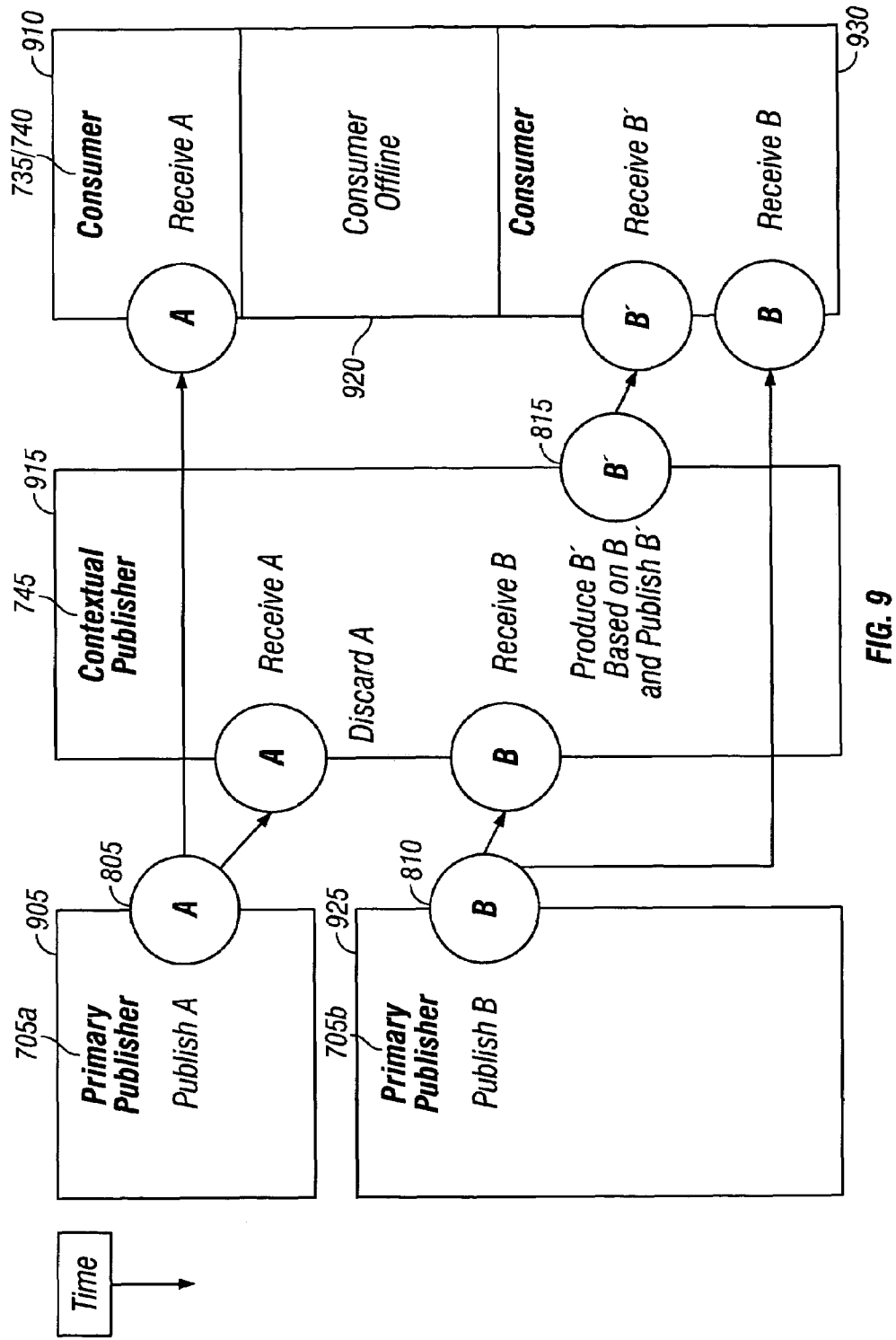
FIG. 9 is a timing diagram of a supplemental content generation system.

FIG. 9 is a timing diagram of a supplemental content generation system. In FIG. 9, message A 805 is sent from primary publisher 705a in a time period 905 to consumer 735/740 in a time period 910. Contextual publisher 745 also receives message A 805 early in a time period 915, and, determining that message A 805 is not relevant to subjects in which this contextual publisher 745 has expertise, then discards message A 805. In a time period 920, consumer 735/740 goes offline (or experiences some network delay or malfunction that prevents or delays reception), and does not have immediate access to wire 710.

Next, in a time period 925, primary publisher 705b publishes message B 810, which is received by contextual publisher 745 later in time period 915. Determining that it has expertise about the subject matter of message B 810, contextual publisher 745 publishes the related message B' 815, which is then passed on (through wire 710) to consumer 735/740 in a time period 930, during which the consumer 735/740 is again online. Message B 810 is received by consumer 735/740 later in time period 930.

It should be understood from FIG. 9 that message B 810 was sent by primary publisher 705b during a portion of time period 925 corresponding to time period 920, during which the consumer 735/740 was offline. Therefore, message B 810 is not immediately received by consumer 735/740. Nonetheless, contextual publisher 745 does receive message B 810, and soon thereafter publishes message B' 815, which is therefore received earlier in time period 930 (during which consumer 735/740 comes back online) than the message B 810 which inspired it, which is ultimately delivered by wire 710.

Figure 10:
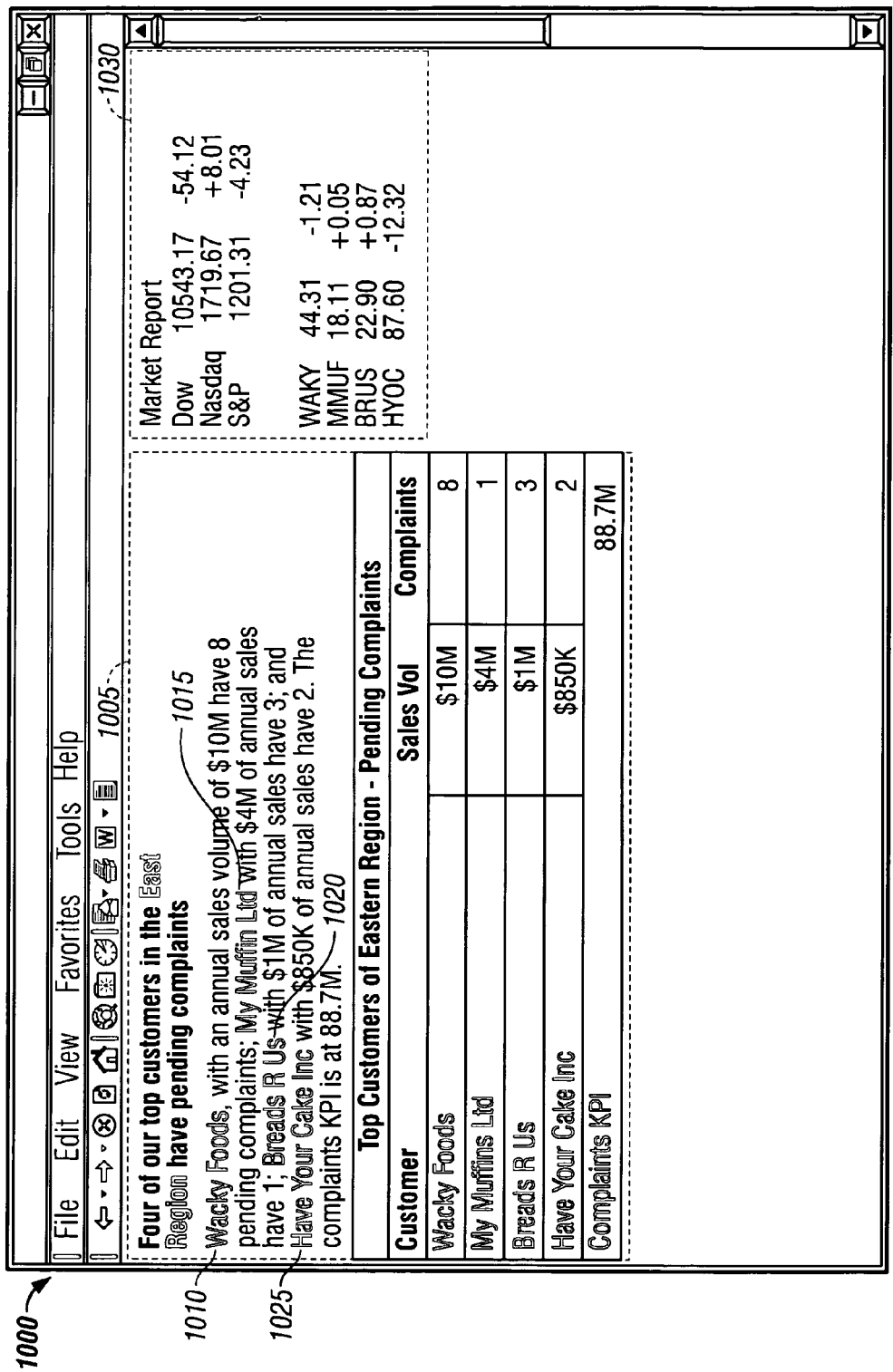
FIG. 10 is a screenshot of a message and supplemental content.

One advantageous reason to produce supplemental, contextual content is to provide consumers with information regarding stories they already find interesting. In this regard, FIG. 10 is a screenshot 1000 of a message and supplemental content. In FIG. 10, a message 1005 contains a message about customers of an enterprise who have pending complaints with the enterprise. The message contains various discussion objects, such as "Wacky Foods" 1010, "My Muffin Ltd" 1015, "Breads R Us" 1020, and "Have Your Cake Inc" 1025. These discussion objects (and their associated classes/categories, not shown) may have been identified by metadata enhancer 120a or 120b in FIG. 7, or may have been identified by the original primary publisher 705.

FIG. 10 also includes a supplemental message 1030. This message was produced by contextual publisher 745, according to the process described above. Messages 1005 and 1030 can be delivered and rendered to the consumer 735/740 in a variety of ways, as referred to above and described in more detail below.

Contextual publisher 745 thus increases the likelihood that users will receive sufficient information on topics that they find interesting, without overburdening either the users or the system(s) delivering the information to the users. In other words, conventional system may be capable of delivering much of the content that a user may find interesting; however, delivering all available content (for example, all stock quotes currently available) would make it difficult for the user to sift through the content to find useful information (for example, a particular stock quote). Even if a client application of a user were implemented for prioritizing such content, the client application itself may become overburdened.

With contextual publisher 745, however, the user may only receive information that the contextual publisher 745 may infer will be useful. In this way, a burden on both the user and the user's client application is reduced, and the likelihood of the user receiving information that is both interesting and useful to the user may be increased.

Contextual publisher 745 can be implemented in different ways, depending on the addressing scheme being used. For example, with direct addressing, all messages are generally routed directly to the consumer. Thus, because contextual publisher 745 does not impersonate a specific consumer, the contextual publisher 745 does not have access to the messages. In order to enable content enrichment in this environment, contextual publisher 745 may be run in a privileged environment where it has access to all messages. In the privileged environment, contextual publisher 745 can analyze each message and, where applicable, generate a supplemental message. In most cases in this type of scenario, the supplemental message will be addressed to the addressee of the original message.

For example, a contextual publisher for an email system may be installed on the email server itself. It would therefore have access to all incoming and outgoing emails, and would be able to process them. If an email contains a subject that the contextual publisher 745 feels it has something to contribute to, it may generate a new email with supplemental content (or append the supplemental content to the email with the primary content).

In the example of channel-based subscriptions, the contextual publisher 745 can act as a regular subscriber and subscribe to the channel like anybody else. When a new message comes in to the channel, all users, including the contextual publisher 745, will receive it. At this point, the contextual publisher 745 can process the message and may choose to publish a new message that is based on the original one. In some cases the new message will be directed to the same channel, since it is likely to deal with the same topic as the original message. In others, it may be directed to another channel.

For example, assume a messaging system with a channel for customer complaints. A contextual publisher 745 may eavesdrop on (subscribe to) this channel and process all incoming complaints. Out of each message, the contextual publisher 745 may extract the customer who complained and generate a full customer report for that customer. This report may then be broadcast (via the wire 710) on another channel.

With content-based messaging, ("CBM"), the contextual publisher 745 is free to use the fine-grained subscription mechanism to subscribe to only those messages for which it has (or can obtain or generate) supplemental content. This reduces the overhead of processing messages that will not generate supplemental content. Once a message does pass through to the contextual publisher 745, the contextual publisher 745 generates the supplemental message and publishes it. Moreover, in the CBM environment, as long as the right metadata is included in the supplemental message, the message will find its way to the right consumers.

For example, the contextual publisher 745 may subscribe only to messages that contain metadata about companies. Once received, the contextual publisher 745 will thus look up the quotes, generate a new message (making sure to mark it with the same metadata as the old message) and publish it to the wire. Because the metadata is the same and because consumers subscribe based on metadata, those consumers that receive the original message are very likely to receive the supplemental message.

Because there could be several contextual publishers, some might produce supplemental content that is based on another's supplemental content (as opposed to an original message of a primary publisher). This may produce a cascade effect of messages. If needed, it is possible to eliminate cascading by preventing contextual publishers from receiving messages of anyone but primary publishers. Alternatively, if cascading is desired, its flow may be controlled in other means to prevent an overflow of messages and, even in extreme situations, an infinite feedback loop between publishers.

Figure 11:
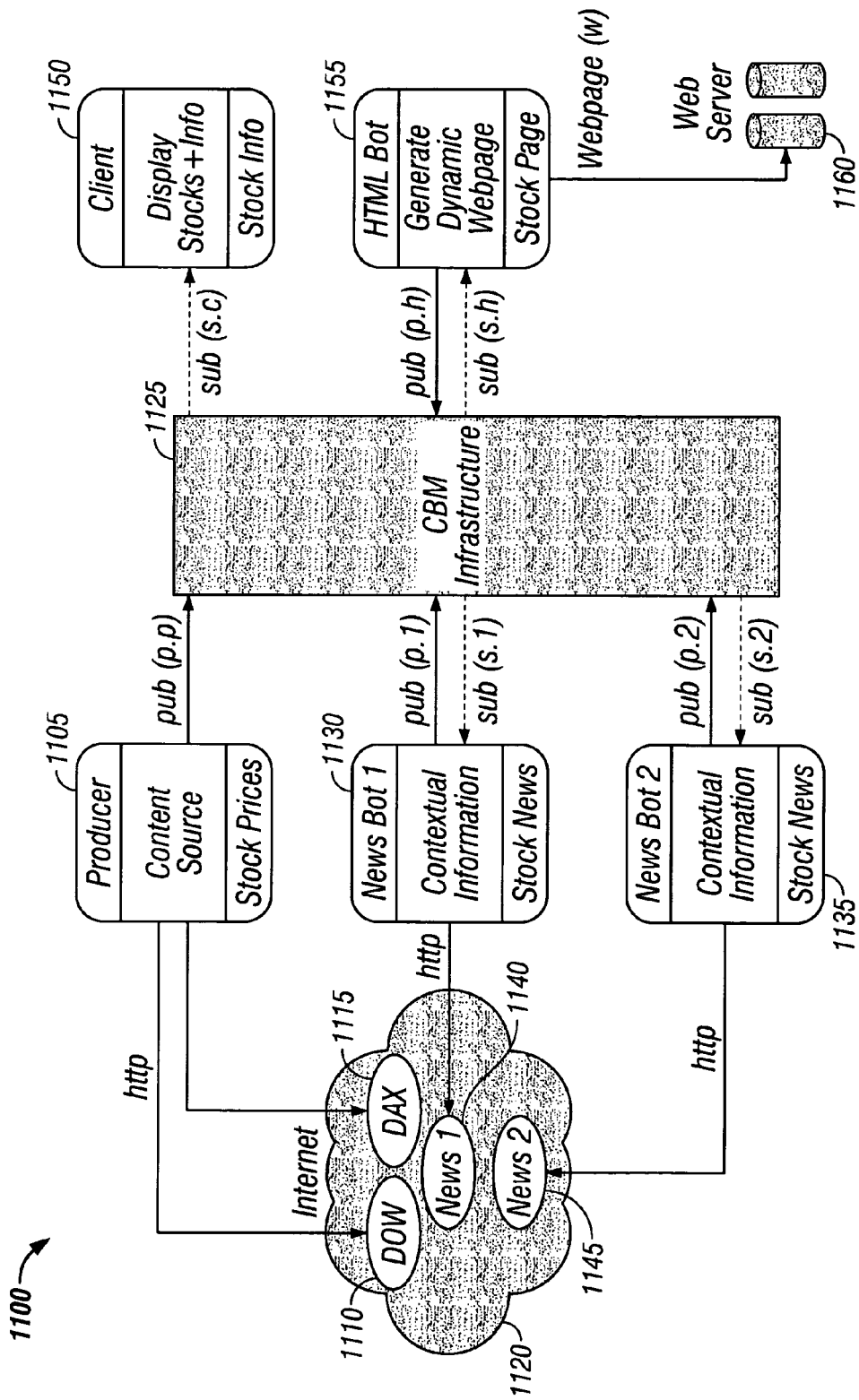
FIG. 11 is a block diagram of a supplemental content generation system in a content-based messaging environment.

FIG. 11 is a block diagram 1100 of a supplemental content generation system in a content-based messaging environment. In FIG. 11, a producer (primary publisher) 1105 reads stock quotes from various sources, such as a DOW 1110 and a DAX 1115 (representing an American and German stock index, respectively), via, for example, the Internet 1120. The stock quotes may then be mapped onto a message (not shown) and published onto a CBM infrastructure 1125, which may be thought of as a type of wire 710. In this example, the message contains the symbol of the stock, the stock quote, a time stamp of the quote, and the source of the quote.

Meanwhile, a newsbot 1130 and a newsbot 1135 may read news articles from various other individual sources, such as a news source 1140 and a news source 1145, respectively, and store the articles as messages within a local database (not shown). The newsbots 1130 and 1135 may be, for example, software agents as described above, and may be collecting information about stocks in the news.

Each newsbot 1130 and 1135 subscribes to messages on CBM infrastructure 1125 to receive messages that contain stock quotes and are not generated by any other newsbot. Each newsbot 1130 and 1135 publishes messages that contain, for example, the ticker symbol contained in the original message, the name of the newsbot that published the message, and a Uniform Resource Locator ("URL") that points to the original news story on the web (i.e., the original message which triggered the collection of the stock quote (s)). Alternatively, the newsbot 1130 or 1135 may publish a message that contains the news story and stock quote(s) directly, rather than pointing to their location on the web.

A client 1150 subscribes to those messages that contain symbols that an associated user (not shown) is interested in.

Finally, an HTML bot 1155 subscribes to all messages that contain a stock symbol, and stores incoming messages in an internal database. Upon the fulfillment of some pre-determined rule or condition for generating contextual content, the HTML bot may generate a webpage containing at least the stock symbol(s)/quote(s) (and possibly also the original news story), and placed on a webserver 1160. Then, a new message is generated containing the original message containing the stock symbol, the name of the HTML bot that published the message, and a URL pointing to the generated webpage.

Figure 12:
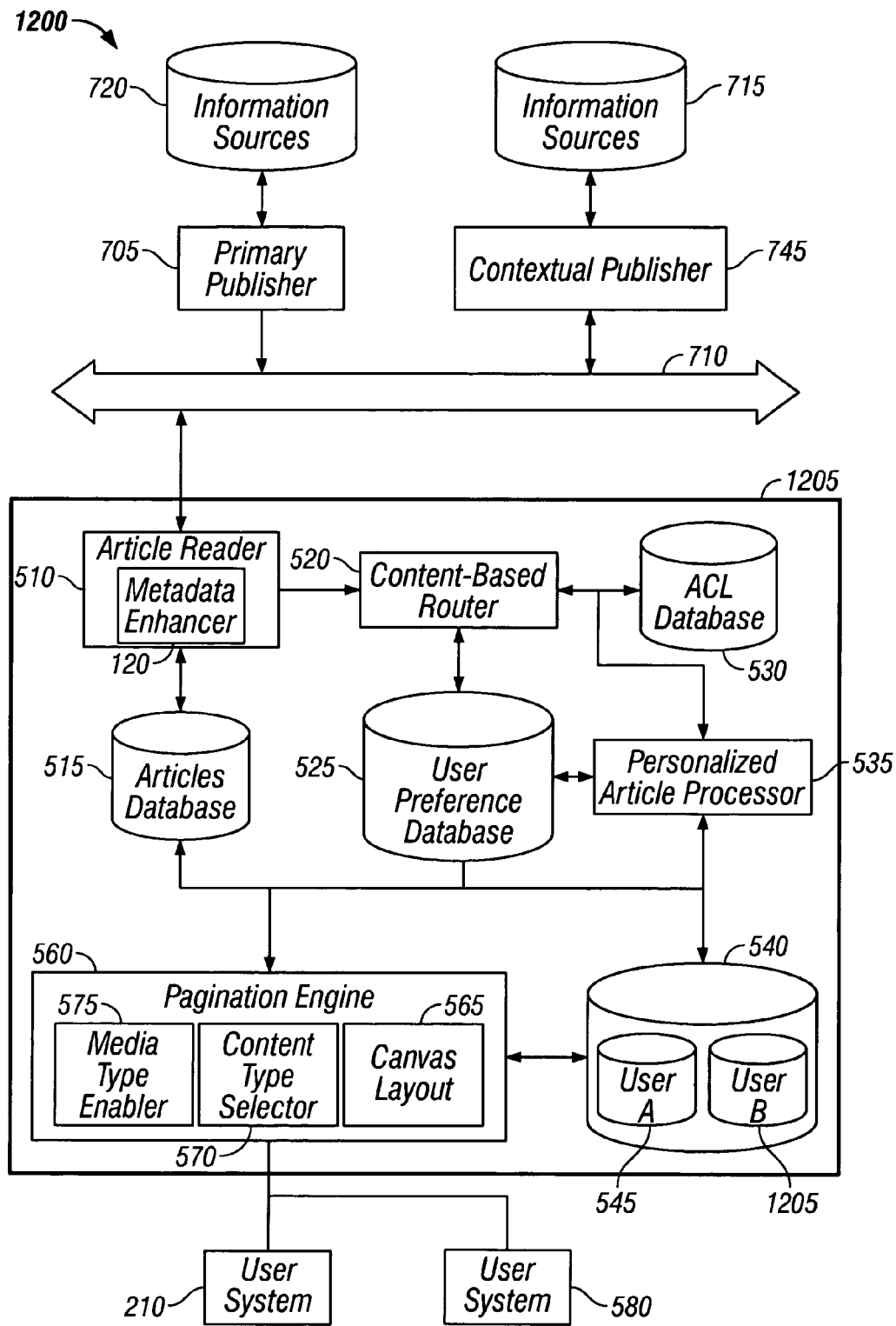
FIG. 12 is a block diagram illustrating a content delivery system using a contextual publisher.

FIG. 12 is a block diagram 1200 illustrating a content delivery system using a contextual publisher 745. As referred to above, messages from primary publisher 705 and contextual publisher 745 may not be in a format that is immediately accessible by user 210. For example, the message may be an XML file that would not be useful to user 210. Thus, a client application such as system 1205 may be necessary to translate the message(s) into a usable format for the user 210.

In FIG. 12, then, client application 1205 is shown to be a content delivery system that is very similar to the content delivery system 505 of FIG. 5. That is, articles/messages from the wire 710 are collected by article reader 510, and prioritized, filtered, aggregated, and assembled for a user 210 by the various components of system 1205, the operation of which was explained with respect to FIG. 5. As with system 505, the system 1205 may also act on behalf of another user, such as user 580. Sorted articles database 540 is shown including a User B database 1210 that may be used to store articles for user 580.

Using client system 1205, user 210 has access to the advantageous features of prioritization and/or filtering that increase the likelihood that the user 210 will receive messages in which he or she is actually interested. Further, supplemental articles can be put into the pool and prioritized along with all the other (that is, the primary) articles, so that a supplemental article that has a relatively low priority will not be shown to user 210. This feature may be particularly helpful when messages are emailed to the user 210, since it will help keep the user 210 from feeling that his or her email inbox has been "spammed," or overwhelmed with uninteresting information. Moreover, system 1205 may include a ratings system for each discussion object, whereby user 210 will be able to rate a particular discussion object or entire message as particularly interesting or disinteresting. This rating may be stored in user preference database 525, so that, over time, the user 210 will be more and more likely to receive messages that are of interest to him or her.

Additionally, pagination engine 560 may provide the content to the user in a format or media (for example, text, audio, video) that the user 210 finds most advantageous. Pagination engine 560 may also be able to reserve space in a rendered page or canvas for supplemental content, since the supplemental content (due to its relatively low priority ranking) might otherwise not be shown on the page.

System 1205, like system 505, assumes that messages and articles are pre-assembled for users, so that they may largely be prioritized and filtered for delivery to user 210 upon a logging on to the system by user 210. This will generally be the case, since contextual publisher 745 must have something (that is, some article or message) to intercept and examine in order to generate supplemental content.

Figure 13:
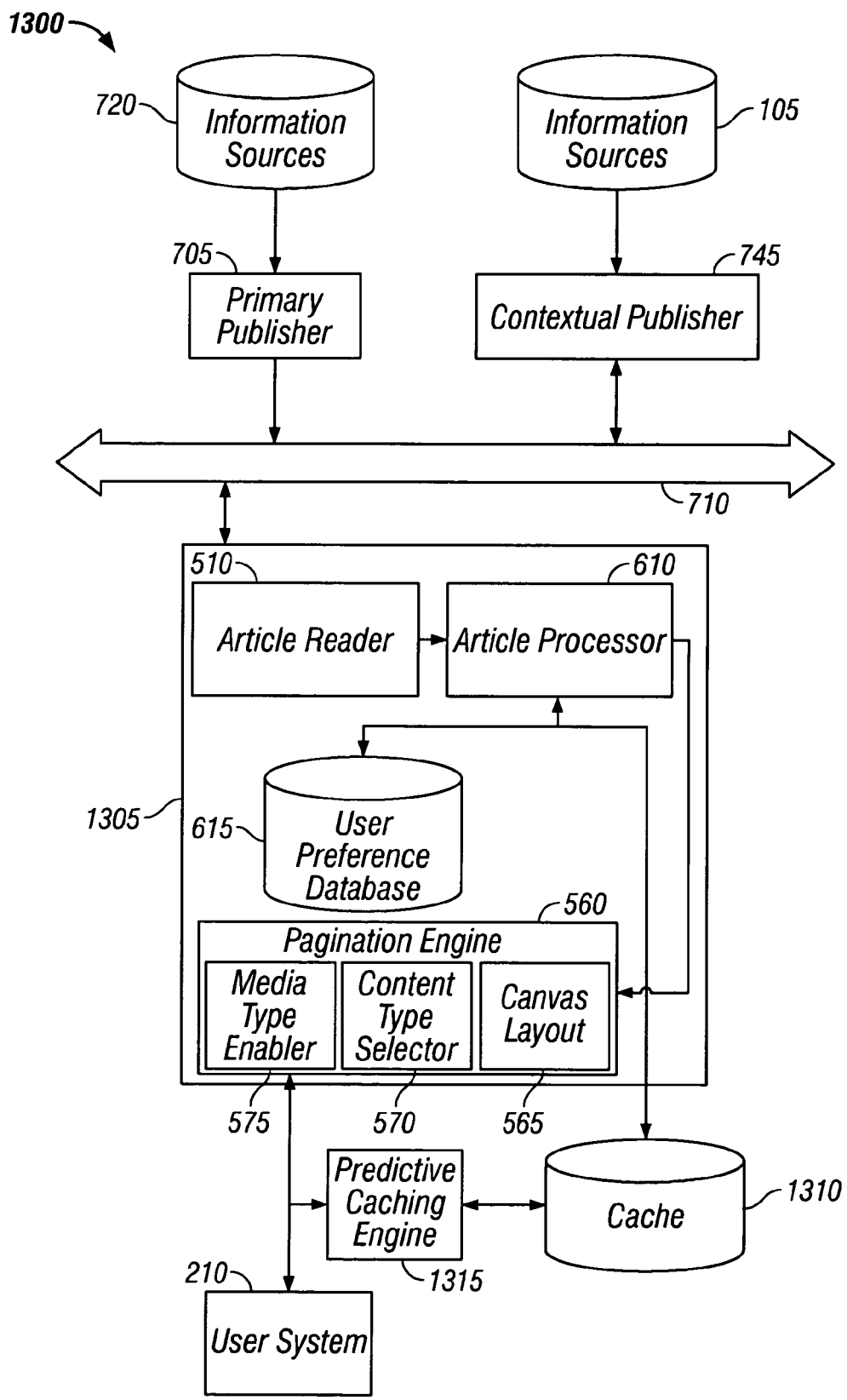
FIG. 13 demonstrates a system for providing supplemental content to a user.

FIG. 13 is a block diagram that demonstrates another system 1305 for providing supplemental content to a user 210. Although system 1205 exemplified a system for providing some subset of pre-assembled articles and associated articles, it is also possible to use the contextual publisher concept in a more conventional portal environment. That is, in a conventional portal environment, as explained above, articles are not assembled for display in, for example, iViews, until user 210 actually requests the page of iViews. Therefore, it is problematic for the contextual publisher 745 to generate supplemental content when the primary content has not yet been determined.

One way to consider the difficulty in utilizing the contextual publisher 745 in a conventional portal environment is to consider the difference between an email system and a live telephone conversation. In the former, the delayed nature of emails results in a number of email messages accumulating in an inbox. As the messages enter the inbox, a contextual publisher 745 having appropriate permissions can generate supplemental content specific to those email messages. In contrast, during a live telephone conversation, it would be more difficult for a contextual publisher to determine topics of conversation and provide supplemental content in a timely fashion.

One way around this problem involves "predictive caching," in which a mechanism predicts, based on, for example, past use of the user 210, types of articles that user 210 may request. For example, the system 1305, having knowledge that user 210 normally logs on every morning, may refresh or update a page of iViews to be delivered to a user sometime during the night before. Based on the resulting articles, supplemental content can be generated and assembled for delivery to the user.

Thus, in system 1305, many of the elements of systems 205 and 605 are displayed. There is no supplemental content selector 125 in system 1305, since supplemental content is provided by contextual publisher 745; however, such a supplemental content selector 125 and associated supplemental content logic could be included, for example, if the supplemental content logic was somehow different from the supplemental content logic used by contextual publisher 745. For example, the supplemental content selector 125 may be more specific to user 210 than simply specifying a particular topic or subject. Similarly, pagination engine 560 is shown to include the canvas layout subsystem 565, the content-type selector 570, and the media-type enabler 575 discussed above for delivering rich media content including audio, video, and text to be rendered as audio and/or video. However, pagination engine 230, without some or all of these features, could also be used.

In FIG. 13, then, system 1305 performs similarly to systems 205 and/or 605, but inputs articles from wire 710 and stores them in a cache 1310, based on an update/refresh initiated by predictive caching engine 1315. Contextual publisher 745, realizing, or being informed, that these articles are in fact being delivered to system 1305, may then generate supplemental content. The supplemental content may also be stored in cache 1310 and delivered when a user logs onto the system 1305.

In FIG. 13, predictive caching engine 1315 and cache 1310 are shown as external to system 1305, in order to emphasize the point that user 210 may, when possible, receive content directly from these elements. In other words, predictive caching engine 1315 may operate as a proxy server of content for user 210, and may be located more closely to user 210 than system 1305 itself. On the other hand, predictive caching engine 1315 may also be incorporated within system 1305. Also, predictive caching engine 1315 may be similarly employed with respect to system 205 in FIG. 2. In neither case will user 210 generally have an ability to determine a source of the content being delivered;

rather, predictive caching engine 1315 and/or pagination engine 560 will make such a determination, based on, for example, an availability of content in cache 1310 and/or the speed from which content can be delivered to user 210 from system 1305 versus predictive caching engine 1315.

In another implementation, space on a rendering canvas, such as one or more iViews on a portal page, can be reserved for supplemental content from a contextual publisher, as described above with respect to FIGS. 2-6. While primary space on the screen (for example, section 305) may be filled as soon as possible, the secondary space 325 may be reserved for future use. In other words, section 325 may remain blank to a user's view while the contextual publisher 745 examines the primary articles and delivers supplemental content to fill the section 325. In this implementation, as well as in other implementations as would be apparent, supplemental content may only be generated after a user has maintained a certain primary article on a canvas for a pre-determined period of time, such as, for example, ten seconds. This technique helps ensure that user 210 is actually interested in a piece of content before supplemental content is generated.

In another implementation, supplemental content may be generated based on a "hot topic" of the day, for example, once a certain number of primary articles have been generated about a specific topic, a contextual publisher 745 or some other supplemental content selector 125 (for example, in FIGS. 2, 5, and 6) may generate supplemental content about that topic for delivery to the user 210. The supplemental articles may be delivered to the user 210 even if the user 210 has expressed no interest in the topic, or even if the user 210 has expressed disinterest in the topic. This feature may be used in system 1305, since supplemental content can be generated about the "hot topic" even without predictive caching. For example, the "hot topic" may also be determined by compiling statistics of what users are seeing and predicting the "hot topic" based on the statistics.

FIG. 14 demonstrates an article 1400 used in one implementation of the system. Article 1400 is written in XML. In article 1400, a section 1405 contains general attributes of the article, such as its author, time of creation, and level of importance. A section 1410 labels a first content portion as being narrative text in proper grammar for reading and having a headline portion 1415 and a details portion 1420. A section 1425 labels a second content portion as being HTML-based, with a headline in section 1430 and a table 1435, as its detailed content.

A section 1440 labels the next content block as containing a viewable image in a standard format such as ".gif." The image has an associated headline in section 1445, and is itself located in section 1450. Finally, a section 1455 labels a last content block as containing music, which may be, for example, background music having no words, in a standard format such as "midi." The actual midi file is in a section 1460.

Although not explicitly shown, it should be understood that video (for example, MPEG) and other formats may also be used. Also, as should be understood from FIG. 6, articles such as article 1400 may include summaries of the articles, or of article portions. Also, content blocks may be labeled as mutually exclusive or not, for example, typically an article summary would not be included in the same page as the article itself, as that would be redundant.

In the implementations described above, a supplemental content selector inputs primary articles, user preferences, and supplemental content logic, and outputs articles having content that supplements the content of the primary articles.

In a conventional portal environment, the supplemental content selector allows the portal to retain space (for example, iViews) on the page for the supplemental content, delivered to the user, for example, with or after the primary content. The primary and supplemental content can also be delivered in various media, including audio or video.

In a personalized, dynamic content delivery system, the supplemental content can be prioritized with, apart from, or based on a prioritization of the primary content, and delivered to the user in a plurality of media formats.

Supplemental content selector can also be used as part of a contextual publisher, which eavesdrops on an information distribution service for content in articles in which it has a particular expertise or ability in adding supplemental content. The supplemental content can then be delivered to the user, via the information distribution system and perhaps a client system interacting with a system of the user. The client system may be, for example, the personalized, dynamic content delivery system described above, or may be any of the other content delivery systems described herein.

A number of implementations of methods and systems for presenting personalized content have been described. Nevertheless, it will be understood that various modifications may be made. Accordingly, other implementations are within the scope of the following claims.

What is claimed is:

1. A system for delivering content; the system comprising:
a message reader operable to monitor an information distribution service and input therefrom a message generated from a first source, the message being sent from a sender to a recipient, the message including electronic content and metadata describing the electronic content, the electronic content including one or more discussion objects generated with the message;
a supplemental content selector operable to:
access rules to determine whether to generate supplemental electronic content that relates to the one or more discussion objects,
parse the electronic content and the metadata to recognize the one or more discussion objects,
determine whether supplemental electronic content is to be generated based on the accessed rules and the recognized discussion objects, and
based on a determination that supplemental electronic content is to be generated, (1) locate documents from a second source that include content related to the one or more discussion objects, (2) aggregate at least a portion of the content descriptive of the subject matter of the located documents to form a cohesive presentation of information, and (3) generate supplemental electronic content for addition to the electronic content based on the cohesive presentation of information; and
a transmitter operable to transmit the generated supplemental electronic content to the recipient and to add the supplemental electronic content to the electronic content.

2. The system of claim 1, wherein the message reader is further operable to select a topic for supplemental electronic content, and monitor the information distribution service to thereby determine that the message is related to the topic.

3. The system of claim 2, wherein the message reader is subscribed to a channel of a channel-based subscription service, wherein the channel corresponds to the topic.

4. The system of claim 2, wherein the message reader is subscribed to a content-based messaging system, and further wherein the message reader is operable to selectively input the message based on a relation between a content of the message and the topic.

5. The system of claim 1, wherein the metadata included in the message characterizes individual elements of electronic content of the message, and further wherein the supplemental content selector is operable to generate the supplemental electronic content based on the metadata.

6. The system of claim 1, wherein the transmitter is further operable to send the supplemental electronic content via the information distribution service.

7. The system of claim 1, wherein the information distribution system is a content-based messaging system.

8. The system of claim 1, wherein the supplemental content selector specializes in a particular subject matter of supplemental electronic content.

9. An apparatus comprising a storage medium having instructions stored thereon, the instructions including:
   a first code segment for reading a message monitored by a message reader from an information distribution service, the message including electronic content and metadata describing the electronic content, the electronic content including one or more discussion objects generated with the message;
   a second code segment for accessing rules to determine whether to generate supplemental electronic content that relates to the one or more discussion objects;
   a third code segment for parsing the electronic content and the metadata to recognize the one or more discussion objects;
   a fourth code segment for determining whether supplemental electronic content is to be generated based on the accessed rules and the recognized discussion objects;
   a fifth code segment for, based on a determination that supplemental electronic content is to be generated, (1) locating documents from a second source that include content related to the one or more discussion objects, (2) aggregating at least a portion of the content descriptive of the subject matter of the located documents to form a cohesive presentation of information, and (3) generating supplemental electronic content for addition to the electronic content based on the cohesive presentation of information; and
   a sixth code segment executing instructions for transmitting the generated supplemental electronic content via the information distribution service.

10. The apparatus of claim 9, wherein the first code segment comprises a seventh code segment for determining a destination of the message.

11. The apparatus of claim 10, wherein the seventh code segment determines the destination based on an email address associated with the message.

12. The apparatus of claim 10, wherein the seventh code segment determines the destination based on channel-subscription information associated with the message.

13. The apparatus of claim 10, further comprising an eighth code segment for transmitting the supplemental electronic content to the destination.

14. The apparatus of claim 9, wherein the metadata included in the message characterizes individual elements of electronic content of the message, and further wherein the third code segment is operable to generate the supplemental electronic content based on the metadata.

15. The apparatus of claim 9, wherein the information distribution service is a content-based messaging system.

16. The apparatus of claim 15, wherein the sixth code segment transmits the supplemental electronic content based on metadata characterizing individual elements of the electronic content of the message.

17. A system for delivering content, the system comprising:
   means for monitoring messages on an information distribution service, each of the messages including electronic content and metadata describing the electronic content, the electronic content including one or more discussion objects generated with the messages;
   means for accessing rules to determine whether to generate supplemental electronic content that relates to the one or more discussion objects;
   means for parsing the electronic content and the metadata to recognize the one or more discussion objects;
   means for determining whether supplemental electronic content is to be generated based on the accessed rules and the recognized discussion objects;
   based on a determination that supplemental electronic content is to be generated, means for (1) locating documents from a second source that include content related to the one or more discussion objects, (2) means for aggregating at least a portion of the content descriptive of the subject matter of the located documents to form a cohesive presentation of information, and (3) means for generating supplemental electronic content based on the cohesive presentation of information;
   means for adding the supplemental electronic content to the electronic content included in at least one monitored message; and
   means for sending the supplemental electronic content to a recipient of the monitored message.

18. A system for delivering content, the system comprising:
   a message reader operable to monitor an information distribution service and input therefrom a message generated from a first source, the message being sent from a sender to a recipient, the message including electronic content and metadata describing the electronic content, the electronic content including one or more discussion objects generated with the message;
   a supplemental content selector operable to:
      access rules to determine whether to generate supplemental electronic content that relates to the one or more discussion objects,
      analyze the electronic content and the metadata included in the message to recognize the one or more discussion objects,
      determine the subject matter of the message based on the discussion objects,
      determine whether supplemental electronic content is to be generated based on the accessed rules and the determined subject matter,
      determine routing information associated with the message, and
      based on a determination that supplemental electronic content is to be generated, (1) locate documents from a second source that include content related to the one or more discussion objects, (2) aggregate at least a portion of the content descriptive of the subject matter of the located documents to form a cohesive presentation of information, and (3) generate supplemental electronic content for addition to the electronic content based on the cohesive presentation of information; and a transmitter operable to transmit the generated supplemental electronic content to the recipient based on the routing information and to add the supplemental electronic content to the electronic content.

19. The system of claim 18, whwerein the routing information is a email address.

20. The system of claim 18, wherein the routing information is channel-subscription information.

21. The system of claim 18, wherein the routing information is supplemental electronic content metadata characterizing individual elements of the supplemental electronic content.

* * * * *